July 10, 1962 H. D. SHEKELS 3,043,510

DIGITAL COMPUTER CONTROL

Filed Nov. 20, 1957 5 Sheets-Sheet 1

INVENTOR
HOWARD D SHEKELS

BY Cushman, Darby & Cushman
ATTORNEYS

July 10, 1962 H. D. SHEKELS 3,043,510

DIGITAL COMPUTER CONTROL

Filed Nov. 20, 1957 5 Sheets-Sheet 2

INVENTOR

HOWARD D. SHEKELS

BY Cushman, Darby & Cushman

ATTORNEYS

DIGITAL COMPUTER CONTROL

Filed Nov. 20, 1957 5 Sheets-Sheet 3

INVENTOR
HOWARD D. SHEKELS
BY Cushman, Darby & Cushman
ATTORNEYS

INVENTOR
HOWARD D. SHEKELS

BY Cushman, Darby & Cushman
ATTORNEYS

July 10, 1962 H. D. SHEKELS 3,043,510

DIGITAL COMPUTER CONTROL

Filed Nov. 20, 1957 5 Sheets-Sheet 5

INVENTOR

HOWARD D. SHEKELS

BY Cushman, Darby & Cushman

ATTORNEYS

United States Patent Office 3,043,510
Patented July 10, 1962

3,043,510

DIGITAL COMPUTER CONTROL

Howard D. Shekels, St. Paul, Minn., assignor to Sperry Rand Corporation, New York, N.Y., a corporation of Delaware Filed Nov. 20, 1957, Ser. No. 697,636
20 Claims. (Cl. 235—157)

This invention relates to automatic sequence general purpose digital computers, especially the control apparatus thereof.

In general it is impossible to define dogmatic boundaries to a digital computer control. In essence each computer operation consists of a sequence of electrical, electro-mechanical or mechanical events. Any apparatus in a computer causing more than one event to occur can be considered as a portion of the control. In computers, however, it is convenient and economical to make some sequences independent of others, as the sequences can be conveniently self-contained. In memory apparatus, for example, the sequence of electrical events required to sense or alter the residual magnetization of memory cores or to determine the electric charge on the face of a memory tube are independent of other machine events. Similarly the arithmetic, logical, input and output processes can be performed by independently operating apparatus. In the following description the terms "control" or "sequence control" describe the apparatus used to coordinate the events between the above mentioned apparatus in the interpretation, execution and sequencing of instructions. The electrical signals from control to the other sections of the computer may be conveniently termed "commands." In "IRE Standards on Electronic Computers: Definitions of Terms, 1956," 56 IRE 8.51, Institute of Radio Engineers, New York, 1956, "control" is defined as, "1) Usually, those parts of a digital computer which effect the carrying out of instructions in proper sequence, the interpretation of each instruction, and the application of proper signals to the arithmetic unit and other parts in accordance with this interpretation."

As automatic sequence general purpose digital computers are becoming more in demand in a wider variety of applications there is created a need for a computer which is extremely flexible but requiring a minimum of equipment. One approach to providing such a computer is the modification of the sequence control of the computer. To date this approach consists mainly of adding substantial amounts and varieties of switching networks to previous computer designs. This may be observed by noting the increased cost and size of many of the newer computing machines now being built and marketed; for example, see the machine descriptions listed by M. H. Weik in "A Survey of Domestic Electronic Digital Computer Systems," Ballistics Research Laboratory, Aberdeen Proving Ground, Maryland; published by the Office of Technical Services, Department of Commerce, December 1955, as PB 111996 and the 1957 revised issue thereof PB 111996R.

This invention provides an improved and novel logic for sequence controls of general automatic sequence digital computers which greatly expands the flexibility of this class of computers for a given amount of equipment. In computing machines built embodying the teachings of this invention, there are two general types of instructions employed, (1) instructions which are invariable, i.e., fixed by the program and machine designers to cause a definite sequence of events to occur, and (2) instructions which are variable, i.e., the machine interpretation thereof is variable by the operator either directly or indirectly.

Accordingly, it is an object of this invention to provide in an automatic sequence control of a general purpose digital computer a new and improved machine logic.

Another object of this invention is to provide a new automatic sequence control logic which enables a general purpose digital computer to become adaptable to a wide range of diverse applications.

Still another object of this invention is to provide an automatic sequence control logic which enables a general purpose digital computer to execute a predetermined action or actions in less time without substantially increasing the total amount of apparatus.

A further object of this invention is to provide a sequence control logic for general purpose digital computers which enhances the programming flexibility thereof.

A still further object of this invention is to provide a sequence control logic for a general purpose digital computer which eliminates storage media or memory references in the machine execution of a predetermined action or actions.

Yet another object of this invention is the provision in an automatic sequence control for a general purpose digital computer the combination of variable and invariable instructions.

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

Figure 1:
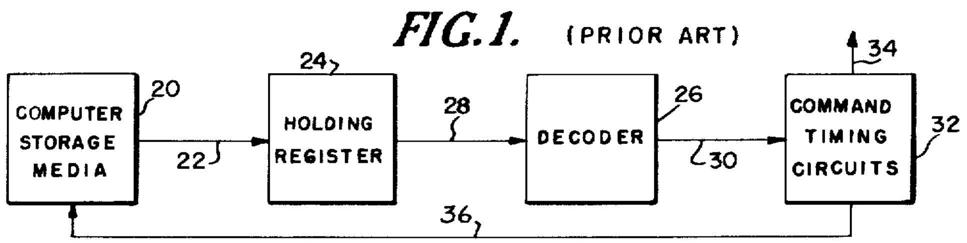
FIG. 1. (PRIOR ART)
FIGURE 1 is a functional block diagram of a prior art internally or externally stored program general purpose digital computer sequence control with the storage media.

The term "instruction" as used herein signifies a predetermined sequence of events as finally to be performed by a computer. As previously indicated, instructions may be of the invariable or variable type. In either case, each is represented originally by what is herein termed an "instruction word" meaning a predetermined set of electrical signals encoded to represent either a variable or invariable instruction as set forth in a binary number system. An instruction word is the first or primary indication to the computer of an instruction. An instruction word indicates an instruction sequence and each causes a succession of electrical signals conveniently termed "commands" which initiate sequences in the processing or arithmetic unit or other portions of the computer. The term "program" refers to a predetermined set of instructions arranged in a particular manner to solve a desired problem or to execute a given action. Of course, any single instruction may be used several times in any given program. Other terms used herein follow the definitions of "IRE Standards on Electronic Computers: Definition of Terms, 1956," supra.

The multiplicity of instructions normally available from which a programmer must choose to construct a given computer program varies considerably among different prior art computers, the choice depending, inter alia, on cost of the computer, the type of calculations for which it was designed, and the characteristics of the input-output equipment associated therewith. In general, provisions are made in all computers for the elementary arithmetic operations of add, subtract, multiply, and divide, as well as for some form of logical branching. The branching provision is very important, since computer programs often consist of several alternative routines, one of which is followed if the result of an arithmetic operation at some intermediate point is positive, and another if the result is negative.

Logical branching is performed by the conditional jump. The branching or jump operation is usually performed in a predetermined and fixed manner to refer to alternative programs or sub-programs of instruction. Some computers provide instructions with arithmetic plus logical branching operations, thus eliminating references to memory and thereby saving machine time.

Contemporary programmable computers may be defined in three classes: (1) externally programmed, (2) plugboard programmed and (3) internally stored program.

(1) In externally stored program computers the program is stored on a record media, such as punched cards, tape, or the like, and the instruction words pass through the computer one at a time. Computers in this class usually are relatively slow and logical branching is rather difficult. The advantages are that internal storage for instructions is minimized and there is no practical limitation on the number of instructions includable in one program.

(2) In plugboard programmed computers the program is determined by the plugboard wiring. Logical branching is effected by selector chains (relay apparatus) and the so-called "Christmas-Tree branching" is efficiently performed. This class of computers may be programmed more efficiently on short programs than any other class of computers, both as to time and equipment required. This class of computers is limited by the number of instructions plugged into the plugboard.

(3) In most internally stored program computers the instructions are stored in the same memory apparatus as data, and arithmetic and logical operations may be performed thereon as if the instructions were data. It is this facility which gives the internally stored program computer its flexibility and makes possible the more sophisticated programming techniques of automatic coding.

This invention provides the advantages of the latter two classes of computers. Therefore, to point out more specifically the novelty of this invention reference is made to the prior art as illustrated in FIGURES 1 and 2.

FIGURE 1 shows a portion of an internally or externally stored program computer type. The program is predetermined by the instruction words stored in the form of digital signals in the computer storage media or memory 20. As far as the remainder of the circuitry is concerned, memory 20 may be either an internal or external record media. The instruction words contained in memory 20 are sequentially transmitted via transfer line 22 to holding register 24 which temporarily holds a word until such time as it is to be decoded in decoder 26. Holding register 22 staticizes the instruction word signals in a form palatable for use by the decoder 26 and are timed to be transferred thereto over line 28. Decoder 26 is usually of the matrix type and translates the D.C. enable voltages on line 28 into at least one signal representing an operation code on line 30, and into other signals representing addresses for the memory or arithmetic registers (not shown). The signal on transfer line 30 is provided to the command timing circuits 32 for sequencing the commands to other parts of the computer over transfer line 34. In the command timing circuits 32, the decoder output signal on line 30 is meshed with timing and synchronizing signals from a clock (not shown) to generate commands on line 34 necessary in executing an instruction. One of the commands must initiate reference to the storage media 20 by signals on line 36 to obtain the next instruction word.

Representative examples of internally programmed computers which are generally like the circuitry illustrated in FIGURE 1, are SEAC and DYSEAC, both of which are referred to in "Transactions of the IRE-Professional Group on Electronic Computers," March 1953 and June 1954 issues. Instruction sequencing for executing a given program of instructions in such computers usually includes automatic indexing means. When an instruction word is to be transferred from its stored media to the decoding apparatus, the memory location or address therefor is indicated by a counter, usually of the flip-flop variety, which provides the automatic indexing for the program. Such a counter, can be conveniently referred to as a program address counter, in short, PAK. It can be incremented or reset according to the type of instruction executed, i.e., jump instructions, for example, may cause the counter to be set to a predetermined memory address. Usually, an instruction word indicative of the next instruction to be executed in a program of instructions is located in the storage media at a successive address. Thus, if PAK is advanced or incremented +1 each time an instruction word is transferred from memory, the memory address indicated by the state of the counter is the location of the next instruction word to be accessed. However, if the counter is reset or is otherwise modified other than by incrementing the contents thereof +1, the next instruction word is accessed at the new memory address indicated thereby. The execution of the program continues as before but the instruction words are obtained from the new set of the successive memory addresses.

Figure 2:
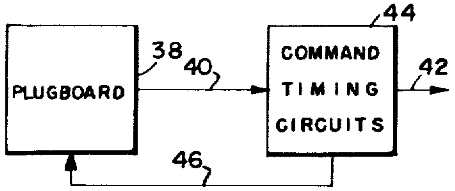
FIG. 2. (PRIOR ART)
FIGURE 2 is a functional block diagram of a prior art plugboard programmed general purpose digital computer sequence control.

For plugboard programmed computers, a corresponding sequence control system is provided by plugboard 38 as shown in the prior art illustration of FIGURE 2. The sequence of instructions or plugboard steps, as commonly called, and the operand memory addresses are effectively contained and determined in plugboard 38 by the use of patchcords (not shown) plugged into the proper hubs therefor in the plugboard. Each instruction word as defined by the particular patching in the plugboard produces a signal on line 40 to cause command signals on line 42 via the command timing circuits 44 in a manner similar to that described for FIGURE 1. Line 46 issues signals from command timing circuits 44 to cause the next instruction dictated by plugboard 38 to be executed in the usual manner.

The Bell Laboratory computer Model VI, an example of a plugboard program computer, is referred to in Wilkes' book "Automatic Digital Computers" (Wiley, New York, 1956).

A more complete and detailed description of a plugboard computer system, UNIVAC® File Computer Model O may be found in reports PX-170, -171, -178, -184, -191, -215, -401, -407, amongst others, all issued by Remington Rand UNIVAC®, Division of Sperry Rand Corporation, St. Paul, Minnesota.

In addition to sequencing, plugboards are used as transposition apparatus in communication links transporting instruction words to the sequence control, for example, as used in the UNIVAC 220, IBM–CPC, Bull GAMMA III, and the BTL MARK VI. The operation of the plugboard in such computers is generally to redefine the sequence of operations with respect to the instruction coding, i.e., change the interpretation of the instruction word. All instruction words are contained on the input media in the form of a hole or no hole in a tape or card representing a binary "1" or "0," respectively, and select a plugboard sequence. In these computers the plugboard operates in one of two independent capacities: (1) provides complete program sequencing, or (2) defines machine sequences selected by instruction words located on punched cards or tape, i.e., interprets instructions. In the latter function the program is located on the input media.

Figure 3:
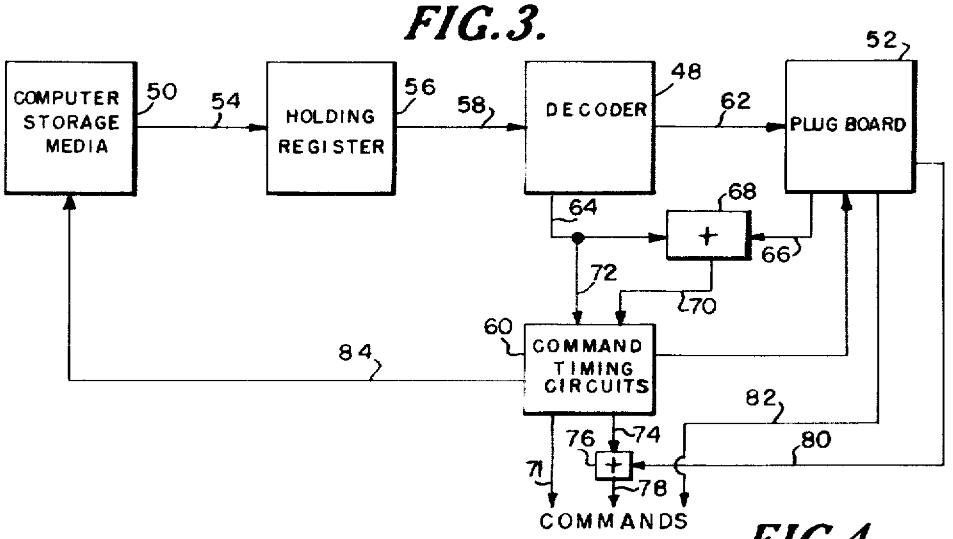
FIGURE 3 is a functional block diagram of a sequence control according to the teachings of this invention.

In accordance with the present invention, apparatus similar to that of FIGURES 1 and 2 are combined to provide a highly flexible programable computer. FIGURE 3 illustrates the general circuitry for combining FIGURES 1 and 2, while FIGURES 6, 7A plus 7B and 8 detail the invention to a much greater degree. By causing decoding apparatus 48 to operate on instruction words of both the invariable and variable type previously stored in the computer (internal or external) storage media 50 in the form of groups of electrical impulses, command signals for causing performance of numerous operations in the computer may be determined by the stored program and/or a program preset in the plugboard 52 as now explained.

An overall computer program designed to achieve some computational result is, in accordance with this invention, actually the combination of two different programs. The first of these programs is predetermined by a set of instructions which are herein referred to as "invariable instructions." The second program is a variable program which is based on other instructions which are herein termed "variable instructions." Each of the two programs specifies different operations which the processing unit of the computer is to perform, as well as the order in which it is to perform them. Among such operations are arithmetic, logical, and transfer operations. The overall computer program finally effects some arithmetic operation, but the intermediate operations required to obtain the desired result will normally include other operations. Each instruction usually causes a processing system, such as an arithmetic unit of the type referred to in the above mentioned publications PX–178 and PX–184, to perform one or more operations on one or more operands. An operand as referred to herein is usually a combination of electrical impulses indicative of information in one of the numeric or alpha-numeric enumeration systems well known in the art. In addition, each instruction must specify the next instruction word's memory location if the serial order in which the instructions are to be executed is not determined by separate counting or indexing apparatus.

An instruction word which specifies an invariable or variable instruction may conveniently be defined as functionally being comprised of four sections: The first section is termed the operation code OP which, in accordance with one of the two basic codes it may represent, is indicative of the operation to be performed by the processing unit; the other three sections may be referred to as the U, V, and W sections respectively. These sections accomplish various ends in the computer, and in one instance indicate the addresses for the stored operands. Each of the four sections of an instruction word may comprise as many characters as desired, but for the purpose of this explanation, the OP section is assumed to consist of two decimal characters, while the U, V, and W sections are assumed to consist of three decimal characters. For the convenience of operation of the computer, the decimal number representing any section of an instruction word is represented in a corresponding binary number system. The preferred binary number system for the computer is the excess-3 code, although this is not an essential to the operation of the apparatus in accordance with this invention.

Binary signals representing the operation code OP are encoded in accordance with several criteria. First, the decimal number representing an OP section of an instruction word may vary from 00 to 99 since it is a two-decimal character number. Arbitrarily and for purposes of this explanation, this number range is divided into two portions, the first of which is 1 through 49, and the second of which is 51 through 99. The lower range numbers, when appearing in an instruction word by their corresponding signals, indicate that an invariable sequence of operations is to be performed by the processing unit. Different ones of the numbers in the lower range may specify that given operations respectively, such as addition, multiplication, etc. are to occur.

When the OP section of an instruction word consists of a number from 51 to 99, a variable instruction is to be executed and the second program is brought into effect to cause the execution thereof. The second program is basically determined by which of the numbers from 51 to 99 is in the OP section of the instruction word, but the program may be varied considerably by means designating any one of a variety of second programs in response to the variable type instruction word. The means for predetermining the second program in accordance with an instruction word whose OP section contains a number from 51 to 99, includes in one instance, manual selection apparatus, such as plugboard 52, well known in the computer art and fully described in the above-mentioned publications PX–170 and 171.

Reference is again made to FIGURE 3. Instruction words in the form of impulse groups are extracted from storage media 50 and conveyed over line 54 to holding register 56. At given times, as later explained, an instruction word signal in register 56 is transferred via line 58 to decoder 48. The digital signals representing the OP section of each instruction word are translated by decoder 48 into one D.C. signal indicative of the operation code. As previously explained, each set of OP signals is encoded in accordance with one of two general types of instructions. That is, if the OP signals represent a decimal number less than 50, for example, the instruction represented thereby is an invariable instruction, while if the OP signals represent a number greater than 50 (and less than 100) the instruction represented thereby is a variable instruction in that the commands resulting from command timing circuits 60 may be variable in their sequence rather than fixed as would be caused by an invariable type instruction signal. Plugboard 52 is energized when decoder 48 decodes a variable type instruction signal by providing a signal in channel 62. When invariable type instruction words are decoded, a signal is provided in channel 64 by decoder 48. Each channel 62, 64 as will later be described in detail, is in reality a trunk line or the like, though represented by a single line in FIGURE 3, in which information may be channeled. The output of plugboard 52, as determined basically by a variable type instruction word signal in channel 62 modified by the program defined by the patchcord connections in plugboard 52, issues on line 66 to the multiple OR circuit 68 which connects via trunk line 70 to command timing circuits 60. The signals on trunk line 70 are properly timed in the command timing circuits 60 and issue therefrom on line 71 as commands to an arithmetic processing unit, as will later be described.

When an instruction word group of impulses is decoded, decoder 48 thereupon selects one of channels 62, 64 in accordance with whether the OP section of the instruction word represents a variable or invariable instruction, as previously explained. The U, V, and W sections of the instruction word after insertion in the decoder are employed mainly as memory address indicators in a manner hereinafter to be described, and the addresses so indicated thereby are caused to be selected by signals issuing on channel 72 which is a trunk line effectively connecting to the respective lines in channel 64. The signals in channel 72 are timed in the command timing circuit 60 and issued therefrom via trunk line 74 to multiple OR circuit 76. The output signals on line 78 are then effectively the signals which cause memory references at the addresses specified by the U, V, and W sections of the instruction words. OR circuit 76 also receives signals via trunk line 80 from plugboard 52 which cause memory references at the addresses specified by the patchcord selections made in the plugboard. Addresses acquired in this manner may be those indicated by the U, V and W sections of an instruction word but they need not be. As will be later described, fixed addresses for given memory references are desirable in the operation of the computer and these are obtainable via signals issued from plugboard 52 of trunk line 82. Line 84 carries signals via command timing circuits for causing reference to the next instruction word in storage media 50, for example.

Figures 4, 5:
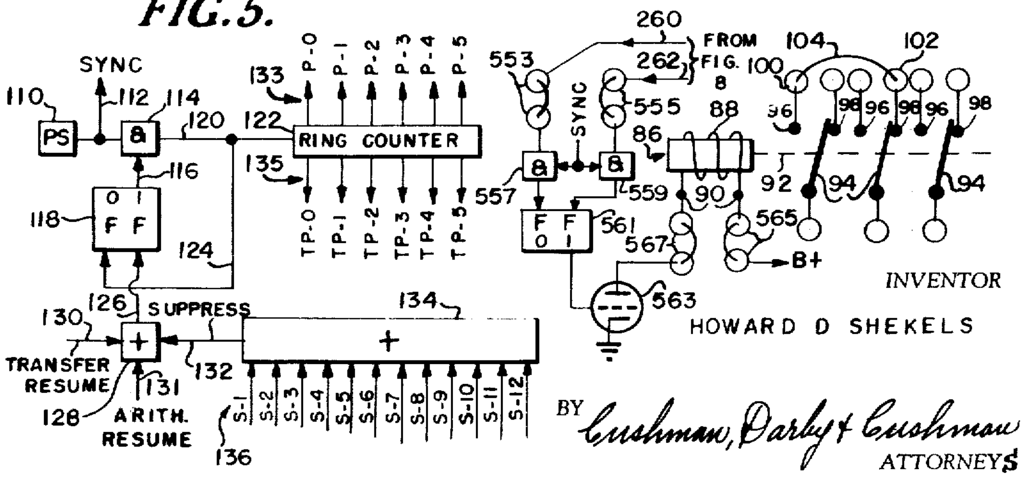
FIGURE 4 is a diagrammatic illustration of selector apparatus for use with a plugboard.
FIGURE 5 is a block diagram of a typical clock for use with a digital computer.

Before proceeding with a fuller description of the invention in relation to FIGURES 6, 7A, 7B, and 8, description of circuits commonly employed in computers will be considered. FIGURE 4 is a brief schematic illustration of a selector of a type which is conventionally used in plugboard apparatus. Essentially FIGURE 4 includes a relay with a solenoid 86 operable by means of current through winding 88 received through terminals 90 to cause its armature, indicated by chain line 92 to move individual switch arms 94 to the left so that each arm will contact terminal 96. When solenoid 86 is de-energized, switches 94 contact terminals 98, respectively, as shown. Connected to each of the terminals 96, 98 are larger circles indicating apertures or hubs such as those utilized for receiving conventional patchcord plugs. That is, one of terminals 96 is connected to hub 100, while one of terminals 98 is connected to hub 102. Arched line 104 between these two hubs, is illustrative of a patchcord, the extremities of which end in the hubs 100 and 102 respectively. This type of illustration will be emplyed, particularly in FIGURES 7A and 7B to indicate patching between hubs in the plugboard. The remainder of FIGURE 4 will be described later.

Digital computers are normally synchronized by a source of electrical impulses termed a "clock." Such a clock may be functionally sub-divided into two parts: (1) A pulse source providing a continuous stream of recurrent pulses, and (2) a selective pulse distributor or commutator. FIGURE 5 illustrates a typical clock, such as one which may be used in conjunction with this invention.

Pulse source 110 in FIGURE 5 provides the continuous stream of recurrent pulses by generating a one microsecond D.C. pulse once every three microseconds. The stream of pulses so generated are provided over line 112 as the usual "sync" or synchronizing pulses employed in computers in the usual manner. The stream of pulses from source 110 is also provided to AND circuit 114 which when enabled by a "1" signal on line 116 from flip-flop 118 issues a pulse on line 120 to a conventional circular shift register or ring counter 122. Each pulse on line 120 is also conveyed via line 124 to the "0" input side of flip-flop 118, thereby reducing the voltage on line 116 to a value insufficient to cause enabling of AND circuit 114. The higher or enabling voltage on line 116 is regained by an input signal on line 126 from OR circuit 128. Input signals to this OR circuit may be either from lines 130 or line 131 which signals represents the termination of a given transfer or process in the computer, or from line 132 as will be explained later.

Each pulse on line 120 also operates to step the counter 122 to its next position. That is, the counter is assumed to have sections or stages, each of which provides output signals. When the counter receives a pulse from line 120, the output signals from the counter change from one stage to the next successive stage. Each stage of the counter provides a D.C. enable voltage which lasts until the next pulse is received from line 120. For convenience these enable voltages as they emerge from their respective stage output lines 133 are labelled P–0, P–1, P–2, P–3, P–4, and P–5. Such enables may be considered as commutator or period distributor pulses. In addition, each stage has an individual output line 135 on which a one microsecond pulse is issued at the beginning of each period distributor pulse. That is, pulse TP–0 occurs at the beginning of the corresponding period enable pulse P–0. The other timing pulses TP–1, TP–2, TP–3, TP–4, TP–5, occur at similar times relative to their corresponding period enable pulses.

The distributor timing pulses TP–0, TP–1, etc., define the beginning of the respective periods of operation of the computer and may be initiated by a pulse on either of lines 130, 131. A single pulse is available on line 130 or 131 at the end of each different operation performed in the computer, and signifies that a new period is to be initiated. For this reason, each of these pulses is termed a "resume" signal.

In addition, a new distributor period may be similarly initiated by a pulse on line 132, which pulse results as an output from OR circuit 134 upon receiving a signal from any one of the S-numbered lines collectively designated 136. OR circuit 134 is provided to cause isolation between the different signal input lines thereto. Inputs on these lines, as will be later evident, occur before what would normally be the period ending time, so as to cause suppression of a given period pulse and to advance ring counter 122 to provide the next timing pulse and period enable pulse. In this manner, different distributor periods in the computer may be shortened so as to provide faster operation of the computer. In all instances in which the period is suppressed, however, the corresponding timing pulse TP always occurs before such suppression is accomplished. Consequently, a timing pulse may be coupled to one of the input lines 136, or a period enable pulse itself may be coupled thereto, as by a gate to cause suppression of the remainder of that period pulse and issuance of another pulse on line 120, thereby changing the counter to its next step.

Whether flip-flop 118 is set to "1" by a signal on line 130, line 131 or line 132, the enable output on line 116 "opens" gate 114, but a signal on line 120 may not occur until up to the third microsecond of time thereafter since pulse source 110 provides a one microsecond pulse every three microseconds as previously explained. In other words, the change from one period to the next may not occur instantly upon an input on line 126 to flip-flop 118, but may be delayed 1 to 3 microseconds.

Although six distributor periods have been illustrated as being obtainable by the clock apparatus in FIGURE 5, it is to be understood that often in digital computers, distributor cycles of more than six periods are utilized. Such may be the situation with the present invention, the illustrated timing cycle being employed for purposes of brevity in describing this invention.

With the foregoing in mind, description of the overall operation of the control apparatus and the computer will now be described relative to FIGURES 6, 7A, 7B and 8 in combination.

The command structure of the computer sequence control is based onl the pulse distributor cycle. In general, particular operations due to commands or types of commands may be arbitrarily associated with a particular pulse distributor period. In this manner several instruction sequences share the same sequencing apparatus. As described, the timing cycle may be conveniently termed a "Command Distributor Cycle." For illustrating the exemplary embodiment the following abbreviated cycle is employed:

TABLE I

| Distributor Period | Command | Actuating Signal |
|---|---|---|
| 0 | Transfer (HR) to decoder | P-0 |
| 1 | Transfer 1st address to MAR | P-1 |
| | Transfer (M) to A | P-1 |
| 2 | Transfer 2nd address to MAR | P-2 |
| | Transfer (M) to B | P-2 |
| 3 | Perform Process | P-3 |
| 4 | Transfer 3rd address to MAR | P-4 |
| | Transfer R to M | P-4 |
| 5 | Switch HR | TP-5 |
| | Transfer (PAK) to MAR | P-5 |
| | Increment PAK | P-5 |
| | Transfer IW to HR | P-5 |

If PAK was modified in period 4, i.e., if R was transferred to PAK, for example, the following additional actions occur at the beginning of the next cycle, the last one being concurrent with the normal (Table I) transfer of (HR) to decoder.

TABLE II

| Distributor Period | Command | Actuating Signal |
|---|---|---|
| 0 | Switch HR | TP-0 |
| | Transfer (PAK) to MAR | P-0 |
| | Increment PAK | P-0 |
| | Transfer another IW to HR | P-0 |

Figure 6:
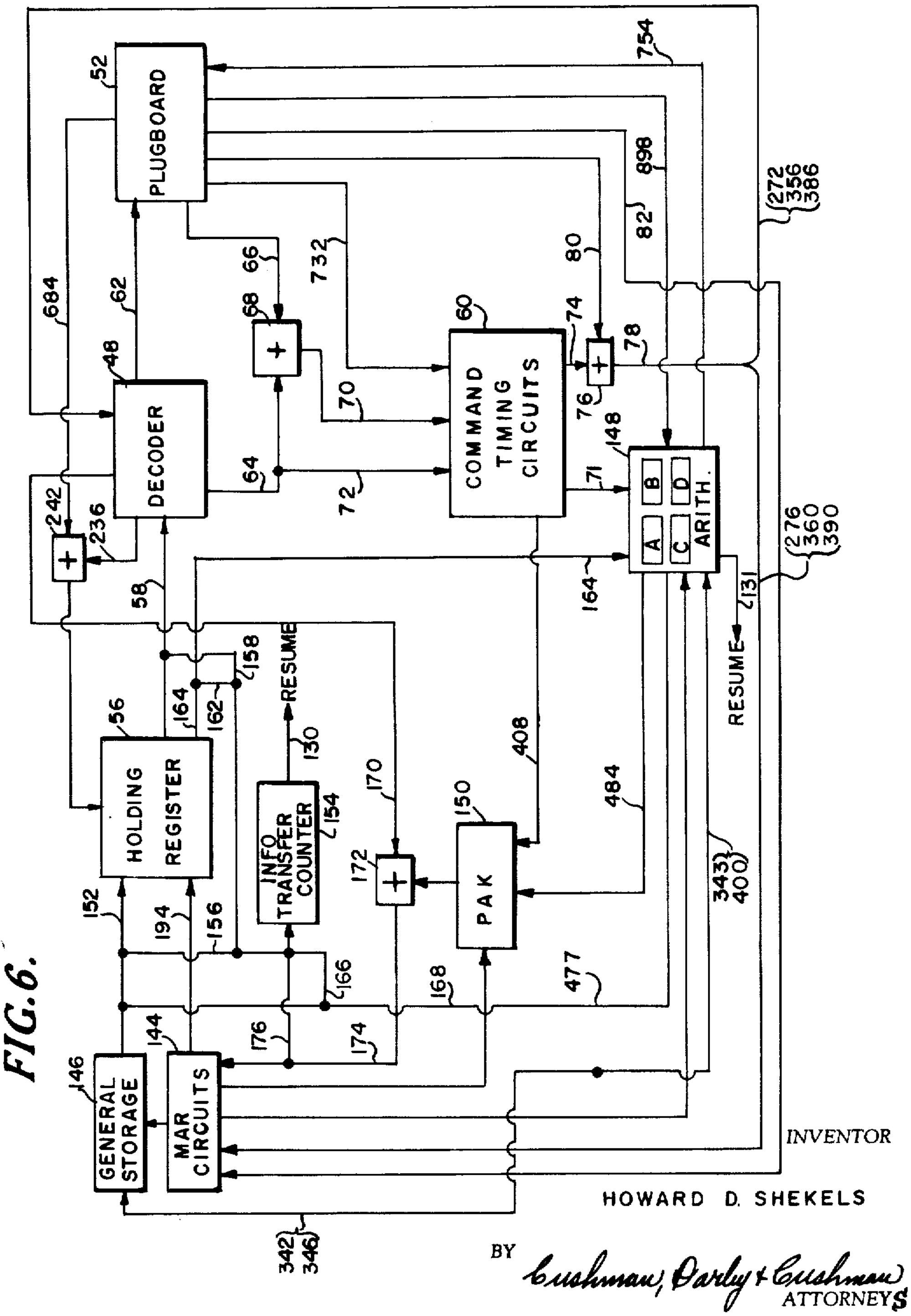
FIGURE 6 is a block diagram similar to that shown in FIGURE 3 but in more detail.

In the above tables, "HR" indicates holding register 56 in FIGURE 6, the decoder referred to is decoder 48, and "MAR" indicates a memory address register in MAR circuits 144 of FIGURE 6. Letters in parentheses, e.g. (HR), refer to the contents of the apparatus enclosed by the parentheses. That is, (HR) is to be read "the contents of HR." "M" refers to "memory" and includes all addressable registers in the computer such as the general storage circuits 146, registers A, B, C and D in the processing or arithmetic unit 148, holding register 56, and the program address counter PAK 150. It may be noted here that the memory address register is not an addressable register but is an address register which effects the addressing of the other registers, as will be later apparent. Further in the above tables, "R" indicates the signals which are indications at least of a part of the resultant of a process carried out by the arithmetic unit 148. R is a very general term and in some instances indicates a sum, others a quotient, one or the other halves of the result of a multiplication process, etc., as will be apparent hereinafter. "IW" is the abbreviation for "instruction word."

Generally all six distributor periods derived by the different period pulses issuing from counter 122 of FIGURE 5 are utilized during the execution of an invariable instruction. However, when plugboard 52 defines the command distribution cycle in response to a variable instruction, a plurality of processes are usually performed in the arithmetic unit 148, but usually only the first process requires all six periods while the subsequent processes require up to periods 1 through 5. The resultant of any process may or may not be stored in a memory location, as per the plugboard defined instruction, and where a period is not utilized, a suppress signal is gated to one of the S-numbered input lines (FIGURE 5) of the OR circuit 134 to advance the counter 120 one stage as previously explained.

The transfer of instruction words from general storage 146 of FIGURE 6 to decoder 48 is performed in two independent stages: (1) transfer of the instruction word from general storage circuits 146 to holding register 56 via transfer line 152 which may be considered a part of trunk line 54 of FIGURE 3; and (2) transfer of the instruction word from holding register 56 to decoder 48 on line 58. In each instance, the binary digits of each instruction word are counted by transfer counter 154. That is, when an instruction word is being transferred over line 152 to holding register 56, the word is also effectively counted as to its number of digits by the connection of line 156 between line 152 and transfer counter 154. In the same manner, instruction words on line 58 are counted as to their number of digits by connection of line 158 between line 58 and counter 154. Effectively, lines 156 and 158 carry setting signals originally setting counter 154 to a predetermined number and the counter then proceeds to count down to zero at which time it issues an end pulse termed "resume" to line 130. Such resume signals are those which were previously referred to as being available to OR circuit 128 via line 130 in FIGURE 5 to advance counter 122 so it will provide its next period pulse. As will be evident from FIGURE 6, transfer counter 154 is also connected by line 162 to line 164 which carries signals transferred from holding register 56 to arithmetic unit 148. In like manner, line 166 connects the transfer counter 154 to line 168 which, at certain times later described, carries signals from arithmetic unit 148 to line 152 into the holding register 56. At other times, the contents of decoder 48 is transferred via line 170, OR circuit 172 and line 174 to MAR circuits 144. Connection of line 174 by line 176 to transfer counter 154 provides the resume pulse at the end of such a transfer. Additionally, the transfer of (PAK) via OR circuit 172 to MAR circuits 144 is likewise counted. Additional resume pulses are issued by arithmetic unit 148 on line 131 at the end of each operation which it performs. These resume pulses are those applied to OR circuit 128 (FIGURE 5) via line 131.

For purposes of clarity, it is hereby assumed that any information transferred into holding register 56 whether it be from general storage circuits 146 or from other sources, is termed an "instruction word." Transfer of instruction words into holding register 56 may occur during any one or several of the periods of any distributor cycle, as will be later noted. Before becoming involved with the different periods in which instruction words may be transferred into holding register 56, the operation thereof for any given period may be explained relative to FIGURE 7B wherein holding register 56 is shown in a dash lined box.

In actuality, holding register 56 contains two individual holding registers HR-1 and HR-2 each of which may be considered as one section of a revolving drum or the like. Each of the individual holding registers has an input and an output lead connected to gates by which information may be written into the registers or taken from the registers. For example, the input lead to HR-1 is the output of AND circuit 180, while information is read out from HR-1 through AND circuit 182. In like manner, information is gated into HR-2 by AND circuit 184 and read out therefrom via AND circuit 186. Enabling of these AND circuits is partially controlled by flip-flop 188 which effectively selects which of the two registers is to be read into or out of at any given time. Flip-flop 188 is of the single input type whereby successive signals on line 190 cause enabling voltages successively on output lines 192 and 194', the former being connected to the "1" output side of the flip-flop and the latter to the "0" output side. Line 192 is connected to the input AND circuit 184 for HR-2 and also to the output AND circuit 182 of HR-1. In like manner, the "0" output line 194' is connected to the input AND circuit 180 of HR-1 and to the output AND circuit 186 of HR-2. Consequently, during any given state of flip-flop 188, the input AND circuit for one of the registers and the output AND circuit for the other register are partially enabled to pass an instruction word. To allow an instruction word to be written into one of the registers, an enabling signal is gated to be present on line 194 in a manner to be hereinafter described. With such an enabling signal, both of AND circuits 180, 184 are partially enabled thereby, and the one which is otherwise enabled by the output of flip-flop 188 may pass an instruction word incoming on line 152. That is, with an instruction word entering on line 152, HR–1 is written into when an enabling signal is simultaneously present on line 194 and flip-flop 188 is in its "0" flip-flop state. However, when flip-flop 188 is in its "1" state, HR–2 will be written into.

In a similar manner, HR–1 and HR–2 may have their contents read out when an enabling signal is present on line 196. If flip-flop 188 is in its "0" state, the instruction word in HR–2 will be transferred via AND circuit 186 to OR circuit 198. However, if flip-flop 188 is in its "1" state, an enabling signal on line 196 will cause the contents of HR–1 to be read out through AND circuit 182 to OR circuit 198. In either case OR circuit 198 passes the instruction word to AND circuit 200 which when enabled by a signal on line 202, allows the instruction word to be transferred into decoder 48.

An enabling signal on line 196 may be obtained via OR circuit 204 in one of two ways. The first is by a signal on line 206 and the second is by a signal on line 208. The latter will be described later. The signal on line 206 is a result of an output from AND circuit 210. There are two inputs to AND circuit 210 which must be simultaneously present to cause an output therefrom. The source of an enabling signal on line 212 will be later described, but when it is present (which, as will be seen in connection with FIGURE 8, can only be during distributor period 0) in combination with a "1" output from flip-flop 214, a readout from one of the registers in holding register 56 is effected. From the foregoing, it is apparent that the two registers HR–1 and HR–2 appear for all intents and purposes as a single source and a single destination with unrestricted access for insertion and extraction of signals therefrom. It is also apparent that an instruction word may be transferred from holding register 56 to decorder 48 simultaneously with a transfer of an instruction word into holding register 56 since there are actually two holding registers therewithin effectively operating as one. This ability of holding register 56 to have an instruction word simultaneously transferred in and out thereof is significant in the situation occurring after (PAK) has been modified, as may be noted by Table II above.

Figure 8:
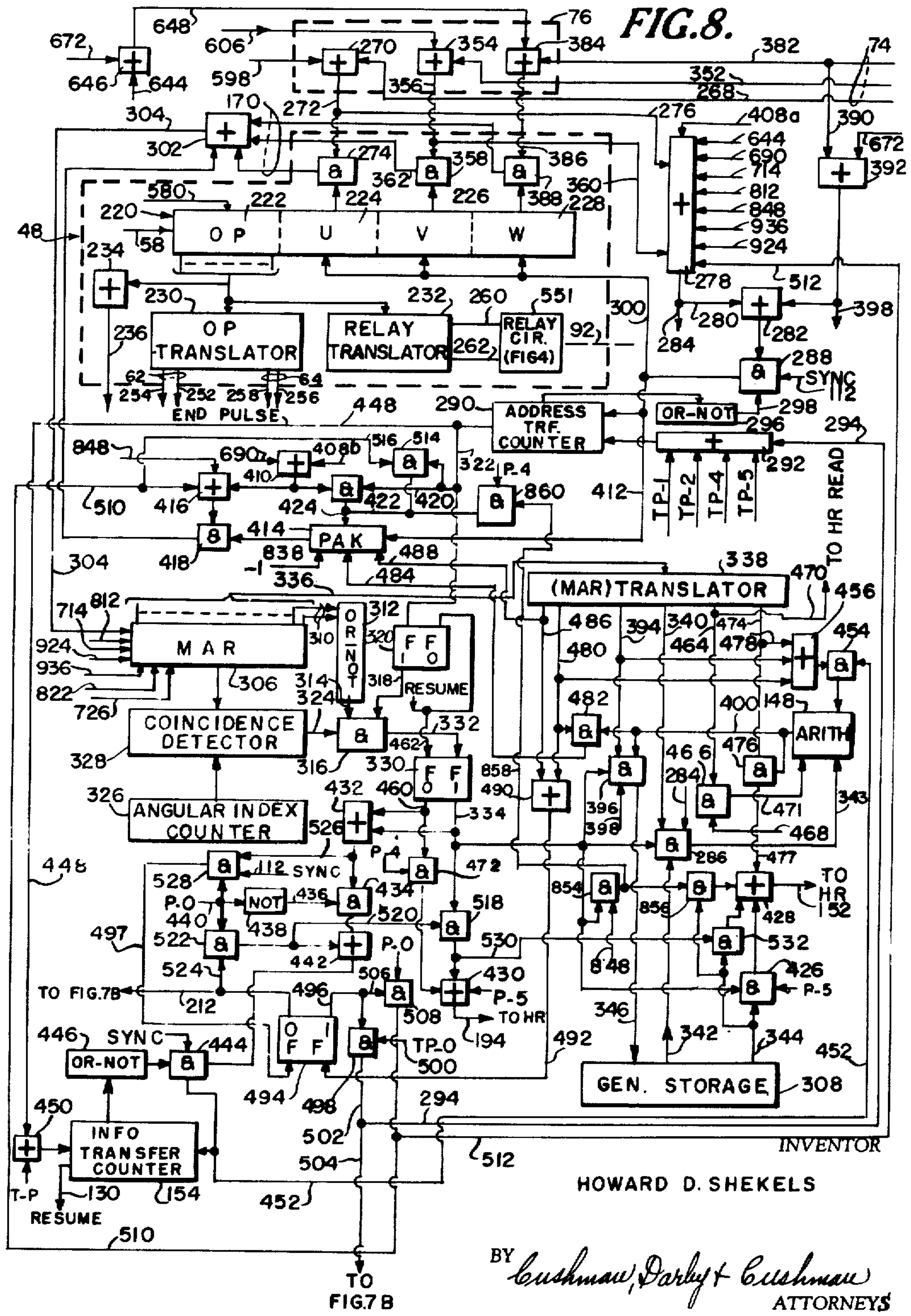
FIGURE 8 illustrates still other apparatus utilized with that of FIGURES 7A and 7B.

Decoder 48 receives the instruction words from holding register 56 successively via line 58 and stores each instruction word in a flip-flop register 220 as shown in FIGURE 8. This register is within decoder 48 and may be a shift register since serial transmission of the instruction words is presumed by the circuitry illustrated. However, it will be apparent to those skilled in the art that parallel transmission of an instruction word to decoder 48 may be accomplished with storage thereof in other types of registers.

As previously indicated, each instruction word consists of four sections, the OP, U, V, and W sections. Register 220 in FIGURE 8 is therefore divided into four sections 222, 224, 226 and 228 for holding the respective instruction word sections. Decoder 48 also includes an OP translator matrix 230 and a similar relay translator matrix 232. Each of these translators may be similar to the matrix switches shown in FIGURE 4–3*a* in "High Speed Computing Devices" by the staff of Engineering Research Associates, Inc., McGraw-Hill, 1950. Since the OP section of an instruction word as previously defined includes two decimal digits which when translated into an excess-three code in the equivalent of eight binary digits, there are eight flip-flop stages in the OP section 222 of register 220. From each of these flip-flop stages, there are two output lines connected as inputs to each of translators 230 and 232. Additionally, each of the "1" output sides of the flip-flop stages in the OP register section 222 is connected to OR circuit 234. Consequently, any time the OP section of an instruction word as expressed in binary code contains a "1," an output will be present on line 236 from OR circuit 234. Conversely, if all the binary digits of an OP section of an instruction word are "0," no signal will be present on line 236, that is, at least no enabling signal will be thereon.

Figure 7A:
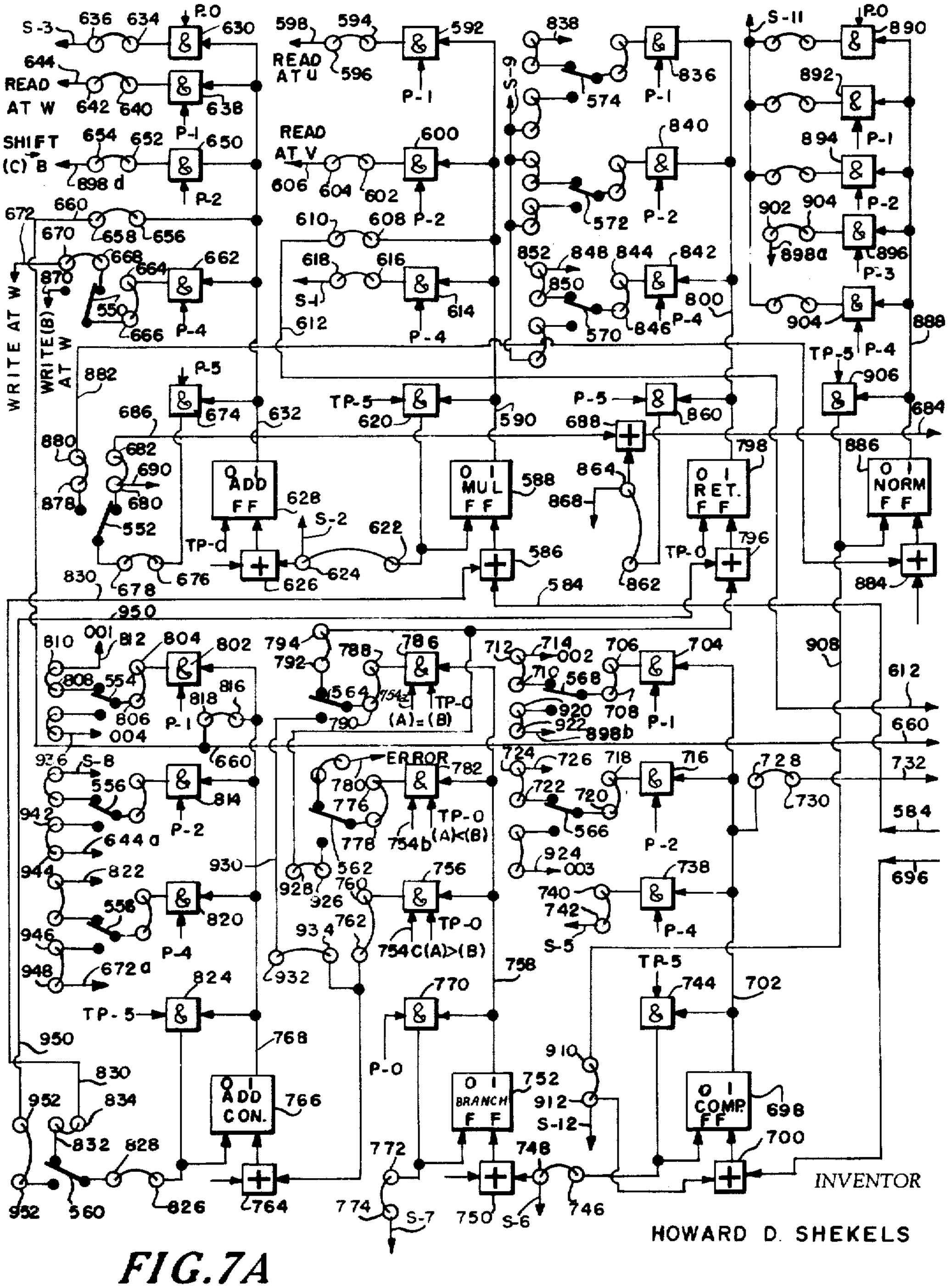
FIGURES 7A and 7B illustrate exemplary control apparatus for sequencing the simplified programs employed to illustrate this invention.
Figure 7B:
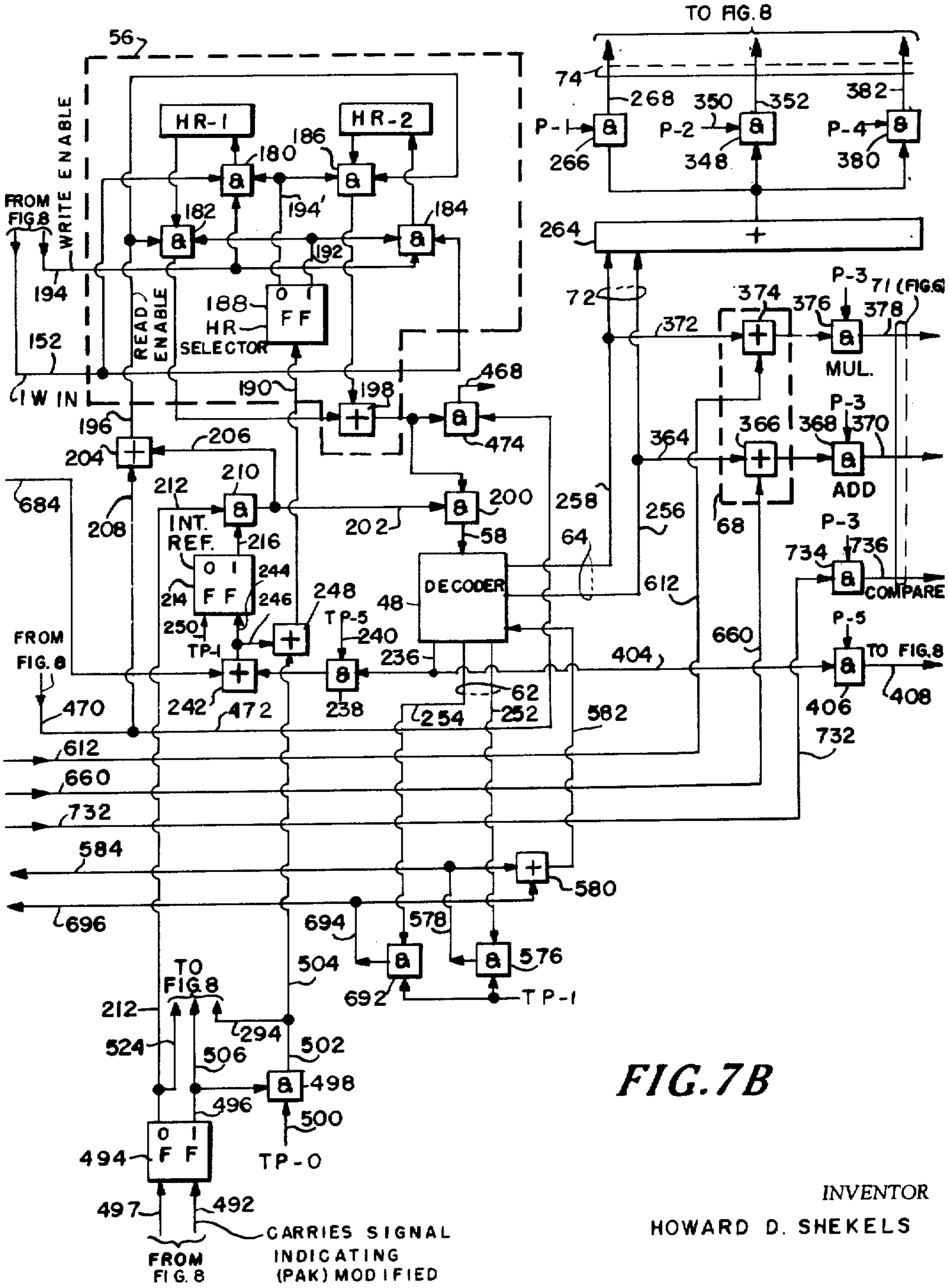

Line 236 of FIGURE 8 is also one of the output lines from decoder 48 in FIGURE 7B. When there is a "1" in any one of the binary digits in the OP section of an instruction word stored in decoder 48, AND circuit 238 is enabled by the relatively high voltage on decoder output line 236. Consequently, any time this situation exists during the beginning of a period 5, a timing pulse TP–5 on line 240 will cause an output from AND circuit 238 to OR circuit 242. The output of this OR circuit is directed by line 244 to the "1" input side of flip-flop 214 and by line 246 to OR circuit 248, the output of which is present on line 190 to toggle the holding register selector flip-flop 188. The issuance of TP–5 via OR circuit 242 to line 244 causes an enable to AND circuit 210 over line 216 as previously described. Assuming a full enablement of AND circuit 210 during period 0 so as to cause a readout of one of the registers in holding register 56, it becomes apparent that a full cycle allows reading from one register during the first part of the cycle and a writing thereinto during the latter part of the cycle, it being understood that internal reference to holding register 56 is initiated by setting flip-flop 214 to its "1" side during period 5 and to its Off or "0" side during period 1 by timing pulse TP–1 on line 250.

By operation of holding register 56 in the manner described above, a new instruction word may be acquired thereby during each period 5 as long as an enabling signal is present on line 194 and an instruction word is presented to line 152 at that time. As will be later seen, this is the case for the normal operation of holding register 56 for several cycles as indicated in Table III.

TABLE III

| Cycle | Period | FF188 | HR-1 | HR-2 |
|---|---|---|---|---|
| 1 | 0 | at "0" | Holds $IW_2$ | Read $IW_1$. |
| | 5 | to "1" | Holds $IW_2$ | Write $IW_3$. |
| 2 | 0 | at "1" | Read $IW_2$ | Holds $IW_3$. |
| | 5 | to "0" | Write $IW_4$ | Holds $IW_3$. |
| 3 | 0 | at "0" | Holds $IW_4$ | Read $IW_3$. |
| | 5 | to "1" | Holds $IW_4$ | Write $IW_5$. |
| 4 | 0 | at "1" | Read $IW_4$ | Holds $IW_5$. |
| | 5 | to "0" | Write $IW_6$ | Holds $IW_5$. |

From Table III it will be noted that an instruction word IW is actually acquired by HR–1 or HR–2 in the fifth period of the second cycle preceding the cycle in which it is actually read out. For example, instruction word $IW_3$, read out from HR–2 in period 0 of cycle 3 was actually acquired thereby in period 5 of cycle 1. Consequently, a whole cycle intervenes between the acquisition of an instruction word and its use so that the intervening cycle may be employed if necessary to modify or replace a stored instruction word. Such modification and replacement of instruction words will later be shown to be accomplished by plugboard circuitry illustrated in FIGURE 7A.

As previously indicated relative to FIGURE 3, decoder 48 provides an output in one of two channels 62, 64. As will be noted in FIGURES 7B and 8, each of these channels includes two different lines, channel 62 including lines 252 and 254 and channel 64 including lines 256 and 258. The OP translator 230 in FIGURE 8 operates to cause a signal in one or the other of channels 62, 64 in accordance with whether the OP section of the instruction word translated is in the range of numbers 1–49 or 51–99 (00 and 50 are defined as "illegal" and are not used). Additionally, one or the other of the lines within each channel is selected to have an enabling voltage thereon in accordance with what particular number in these ranges is present in the OP section. Numerous operations may be performed by arithmetic unit 148, but for convenience and the sake of brevity, only a few of these operations will be referred to herein. It is to be understood that each of channels 62 and 64 may have numerous other lines which might be respectively selected by a given number in an OP section of an instruction word. As previously indicated, when the OP section of the instruction word has a number in the range from 1 to 49, the instruction to be executed thereby is an invariable instruction. The consequence of this is that a number in the 1 to 49 range when translated by OP translator 230, causes an enable signal in channel 64. If the instruction denotes Add, translator 230 in FIGURE 8 causes an enable signal on line 256. For convenience it will be assumed that an OP section of an instruction word when representing the decimal number 14, causes the Add enable on line 256. In a similar manner, it will be assumed that when an instruction specifies Multiply, the OP section of the corresponding instruction word represents the decimal number 43 and provides an enable on line 258.

When the instruction word received by decoder 48 corresponds to a variable instruction, one of the lines in channel 62 is provided with an enable signal. This is the case only when an OP section of an instruction word represents a decimal number from 51 to 99. The particular functions basically determined by which one of the lines in channel 62 is enabled, will be considered later relative to the plugboard operation and FIGURE 7A. In addition to a signal in channel 62 at such times, an output may also be provided from relay translator 232 on one or the other of lines 260, 262 to cause de-energization or energization, respectively, of relay solenoid 86 in a manner later described in accordance with the decimal number which the OP section of the instruction word in decoder 48 represents at a particular time. This also is used as a basis for determining the instructions defined by the plugboard 52 of FIGURE 6 and will be further referred to in relation to the description of the circuitry in FIGURE 7A.

*Invariable Instruction Execution*

The execution of an invariable instruction as represented by an instruction word including an OP section having a decimal number from 1 to 49 will now be described. Since readout of holding register 56 is during period 0, and since at least one microsecond if not three is required to change from period 1 to period 2, the OP translator 230 in FIGURE 8 is sufficiently settled to establish a signal in channel 64 by the beginning of period 1. Whether the OP number of an instruction word in register 220 is number 14 or 43, a signal will be applied to OR circuit 264 in FIGURE 7B. Therefore, AND circuit 266 is enabled by the output of OR circuit 264 to gate P–1 to line 268. This line is included in trunk line 74 of FIGURE 6 and is connected to the multiple OR circuit 76. This is shown in greater detail in FIGURE 8 wherein line 268 enters the multiple OR circuit 76 and goes to a separate OR circuit 270, the output of which is employed over line 272 to enable AND circuit 274. Line 272 is also connected by line 276 to OR circuit 278, the output of which is delivered by line 280 to OR circuit 282 and by line 284 to general storage readout AND circuit 286. The output of OR circuit 282 partially enables AND circuit 288, which when fully enabled, passes "sync" pulses from line 112 (see FIGURE 5) to the address transfer counter 290. This counter is set on the beginning of each of periods 1, 2, 4 and 5 by corresponding timing pulses to OR circuit 292 as well as by a signal on line 294 which occurs in a manner to be later explained. In other words, at the beginning of period 1, TP–1 sets counter 290 to a given number corresponding to the number of binary digits in the U section of an instruction word. Upon so setting the counter, it becomes apparent that at least one of the counter stages will have a "1" therein. Taking advantage of this, each of the "0" output lines from the counter 290 are connected to an OR-NOT circuit 296, the output of which is employed via line 298 to complete the enablement of AND circuit 288. The function of the OR-NOT circuit 296 is such that an enabling output voltage is present therefrom on line 298 when there is a "1" present in any of the counter stages, i.e., when not all of the stages are at "0."

When AND circuit 288 is fully enabled to pass "sync" pulses from line 112, counter 290 begins to count down to zero. In addition, the gated "sync" pulses are utilized over line 300 to cause circular shift of the information in each of the U, V and W sections of register 220. In this manner, the output of these sections is serially presented to their respective AND circuits, and since AND circuit 274 is at this time enabled by a signal on line 272, the U section of the instruction word is transferred via OR circuit 302 and its output line 304 to the memory address register 306. This is the register previously referred to as MAR and may be a flip-flop type register similar to register 220 capable of holding binary digits equivalent to three decimal characters plus two binary digits used as non-general storage indicators as hereinafter described.

The function of MAR is to cause a reference at, and a reading (or writing) of, an operand located at the address inserted into MAR by the signal shifted there into over line 304. For the sake of explanation of this invention, it is assumed that the two least significant binary digits of each address set up in MAR are indicators indicating whether the operand is to be obtained from general storage 308 or from a non-general storage register such as one of registers A, B, C or D in arithmetic unit 148, or the holding register 56, for example. It is further assumed that if the last two binary digits of the address shifted into MAR are both "0," that a general storage reference is to be made, but if either of the two least significant binary digits is a "1," a non-general storage reference is to be made. To distinguish generally between a general storage reference and a non-general storage reference, the "1" output sides of the two least significant flip-flop stages are connected by lines 310 to an OR-NOT circuit 312 whose output line 314 carries an enable signal if there are no "1's" in the last two stages of MAR, i.e., if the last two stages are at "0." AND circuit 316 is partially enabled thereby and is also partially enabled by a "1" output on line 318 from flip-flop 320 which was set to its "1" side by a pulse on line 322. Such issues from address transfer counter 290 each time the counter counts down to zero which signifies the end of the transfer of an address, in this case U, to MAR.

No output is obtained from AND circuit 316, however, until a coincidence signal is present on line 324 following the determination of coincidence between the number in MAR and the successive numbers in the angular index counter 326 by coincidence detector 328. When coincidence is determined, flip-flop 330 is set to its "1" side by a signal on line 332, causing an enable on the flip-flop output line 334. Since a signal on this last line indicates that a general storage reference is to be made, i.e., that information is to be read into or read out of general storage, it is necessary to have a determination as to whether the reference to general storage is a read or write reference. This is accomplished at least in part by connecting all of the flip-flop output leads in MAR 306 via trunk line 336 to translator 338. This translator may be similar to the OP translator 236 and includes a matrix which is responsive to the multiple inputs to cause an output on one line of many available output lines. Since in period 1 it is desired to transfer (M) to register A in arithmetic unit 148 (see Table I), and since the last two significant digits of U, i.e. (MAR), specify (in this assumed instance) that a general storage reference is to be made, it is necessary for the translation of U in translator 338 to cause an enable signal on output line 340. Such an enable along with the enable on line 334 from flip-flop 330 plus the general read enable on line 284 from OR circuit 278, allows an operand to be read from general storage 308 on line 342 through AND circuit 286 over line 343 to arithmetic unit 148.

General storage 308 may be considered as a rotating drum with a plurality of magnetic tracks in which are stored numerous operands. The tracks which contain the operands readable over line 342 may be written into by information received on line 346. Other tracks on the drum contain the successively stored instruction words which are available therefrom on line 344. General storage 308 is assumed to rotate in synchronism with angular index counter 326 so that when coincidence is determined, the reference made to general storage and the information read therefrom is that stored therein at the address specified by MAR.

Thus it is seen that, in accordance with Table I, during period 1, the first address U has been transferred to MAR and that the operand specified by that address has been transferred from a memory unit, in this case, general storage, to the arithmetic register A.

*Period Two Operation*

In period 2, Table I indicates that the second address is to be transferred to MAR and that an operand specified thereby is to be obtained from the memory unit having the MAR address and transferred to arithmetic register B.

Since the decoder register 220 in FIGURE 8 still retains the instruction word delivered thereto during period 0, the OP section thereof still provides an output on one of the llines in channel 64 and consequently in one of the lines in channel 72 (see FIGURE 7B). OR circuit 264 still provides an enabling output signal which during period 2 enables AND circuit 348 to pass the period enable P–2 from line 350 to line 352. This latter line is one of the lines in trunk line 74 (FIGURE 6) which is applied to multiple OR circuit 76. In FIGURE 8 it is shown that line 352 as it enters multiple OR circuit 76, goes to an individual OR circuit 354. Information from the V section of register 220 may then pass through AND circuit 358. However, as in the case with the U section, the V address must be made to shift to cause a readout through AND circuit 358. For this purpose, line 356 is connected via line 360 to OR circuit 278 which in conjunction with timing pulse TP–2 to OR circuit 290 (which presets counter 292) causes full enablement of AND circuit 288 so that sync pulses may pass therethrough and over line 300 to circularly shift V. When V is so shifted and consequently presented to AND circuit 358, the output thereof on line 362 passes via OR circuit 302 and line 304 to MAR 306.

It is again assumed that the two least significant digits of V as shifted into MAR are both "0" so as to indicate a general storage reference. Therefore, an enable signal will be present on line 334 to partially enable the general storage readout AND circuit 286. Likewise, it is assumed that the address now in MAR when translated will provide a signal on line 340 to cause, along with a read signal on input line 284, full enablement of AND circuit 286. Another operand is thereby read out from general storage 308 over line 342 through AND circuit 286 to arithmetic unit 148. The output of AND circuit 286 is again shown to be on line 343. It is to be understood, however, that the operand as read from general storage during period 2 is thereby transferred to register B in arithmetic unit 148. Therefore, it becomes apparent that the single readout AND circuit 286 along with its output line 343 would of necessity have to be duplicated so as to make the output on line 343 during period 2 be directed to register B rather than register A as was the case in period 1. In the same vein, the second AND circuit would be enabled from a line different than line 340 from translator 338. Only one AND circuit 286 is shown in FIGURE 8 for the purpose of brevity. It can be assumed that line 340 and AND circuit 286 are in effect two different AND circuits and two different lines, one of which is for reading into register A and another of which is for reading into register B.

It is thus apparent that during period 2 the second operand has been determined in accordance with the address indicated by V and has been transferred to register B.

*Period Three Operation*

During period 3, Table I specifies that the processing operation is to be performed. For an invariable type instruction, only two examples of the many different processes which may be performed by the processing or arithmetic unit 148 (FIGURE 6) are mentioned. One of these is Addition and the other Multiply. For purposes of explanation, it is assumed that when the OP number is 14, Addition is to occur, and when the OP number is 43, Multiply is the function specified. The OP translator 230 in FIGURE 8 translates each of these numbers and causes an enable signal on line 256 if the OP number is 14 and an enable signal on line 258 if the OP number is 43. With reference to FIGURE 7B, it will be seen that line 256 connects with line 364 and the enable signal thereon passes through OR circuit 366 which is a part of the multiple OR circuit 68 (see also FIGURE 6) to AND circuit 368. This allows AND circuit 368 to gate the period enable P–3 to line 370 which is one of the lines in trunk line 71 of FIGURE 6. This signal indicates to the arithmetic unit 148 that it is to perform the process of addition. Arithmetic unit 148 consequently causes addition of the operands previously stored in registers A and B. The result of the addition is caused by the arithmetic unit to be present in register D, all in the normal manner and particularly as is indicated in the publications heretofore referred to.

If a Multiply enable signal is present on line 258, it is passed via line 372 through OR circuit 374 in the multiple OR circuit 68, to AND circuit 376. The period enable pulse P–3 is thereby gated to line 378 which is another of the lines in trunk line 71 (see FIGURE 6). Multiplication of the operands in registers A and B is thereby caused in the conventional manner with the product being stored in arithmetic registers C and D, the least significant half in the latter register.

Thus it is apparent that the process specified by the operation code has been carried out in period 3 in accordance with Table I.

*Period Four Operation*

In period 4, Table I indicates that a third address, which may be designated by W, is to be transferred to MAR and that R is to be transferred to M. As previously indicated, R and M are general designations for resultant and memory respectively. However, R need not be the full resultant of the process performed in period 3, and in the case of multiplication may be only the most significant half of the product. As will be understood by those skilled in the art, the most significant half of a product is quite useful in computer operations, and it is to be understood that during period 3, the most significant product half is stored in the arithmetic register C for later use.

The transfer of W is performed in a manner similar to the transfer of addresses U and V. Since in period 4 the instruction word presented to decoder 48 is still therein, the OP translator 230 of FIGURE 8 continues to provide a signal on one of the lines in channel 64 to the branch channel 72 (FIGURE 7B) and thence to OR circuit 264. The output thereof enables AND circuit 380 to pass the period enable P–4 to line 382. Again line 382 is one of the lines in trunk line 74 in FIGURE 6 and is consequently connected to the multiple OR circuit 76. In FIGURE 8, line 382 after it enters the multiple OR circuit 76 is connected to an individual OR circuit 384 which provides a signal on line 386 to enable AND circuit 388. This AND circuit is then able to pass information from the W section of register 220. However, in order to present the information therein to an AND circuit 388, W must be shifted. To accomplish this, line 390 is connected between the enable line 382 and a write OR circuit 392. The output of OR circuit 392 is presented to OR circuit 282 for partially enabling AND circuit 288. Since counter 290 is preset through OR circuit 292 by TP–4 at the beginning of period 4, the OR–NOT circuit 296 allows complete enablement of AND circuit 288. Synchronizing pulses from line 112 are consequently gated through AND circuit 288 to line 300 which causes W to shift circularly and be presented to AND circuit 388. The output of AND circuit 388 is inserted into MAR 306 via OR circuit 302 and line 304 as was the case for U and V during periods 1 and 2. When the insertion into MAR is complete, address transfer counter 290 provides an end pulse to flip-flop 320 and also turns itself off by virtue of the OR-NOT circuit 296 recognizing that all the stages of the counter are at zero and consequently disabling AND circuit 288.

As for addresses U and V, address W signifies by its two least significant binary digits whether or not a general storage or a non-general storage memory reference is to be made. It will again be assumed that the last two binary digits are each "0," thereby indicating a general storage reference and providing an enable signal on line 334 from flip-flop 330 in the same manner as previously described. Non-general storage references will be described later. As in the case of U and V addresses, the W address is translated in translator 338 to specify a given output line therefrom. It is assumed that W in this period designates that R from arithmetic unit 148 is to be written into general storage 308. To accomplish this an enable signal is caused on translator output line 394 for partially enabling AND circuit 396. Since line 334 from flip-flop 330 also carries an enable signal and is connected to AND circuit 396, as is the write signal on line 398 as produced from OR circuit 392, AND circuit 396 is fully enabled to pass R as it appears on line 400 to general storage 308.

In order to cause the information designated R to be presented from one of the arithmetic registers over line 400 and to AND circuit 396, a circular shift of the designated register is begun at the moment flip-flop 330 is set to its "1" side. This circular shift is caused by the enable signal on line 334 being utilized via OR circuit 432 to enable AND circuit 434 in conjunction with a signal on line 436. This latter signal is present at all times except during period 0. This is accomplished by the NOT circuit 438 having directed thereto from line 440 the period 0 enable P–0. In other words, when there is no P–0 signal present on line 440, an enable is present on line 436. The output of AND circuit 434 is passed through OR circuit 442 to partially enable AND circuit 444. This AND circuit is otherwise enabled by the output of an OR-NOT circuit 446 which is connected at its input to each of the "0" lines from the information transfer counter 154. At the end of the transfer of (PAK) to MAR, an end pulse issues from address transfer counter 290 as previously described and is conveyed over line 448 to the information transfer counter 154 via OR circuit 450. This accomplishes setting the counter 154 to a predetermined number equal to the largest number of binary digits in any instruction word or like information which is to be transferred in the computer system. Upon so setting the counter, at least one of the flip-flop stages thereof will have a "1" therein and the OR-NOT corcuit 446 will provide an enable to AND circuit 444 indicating that the counter stages are not all at "0." Sync pulses are thereby gated from AND circuit 444 to cause counter 154 to count down to zero at which time an end pulse or "resume" is issued on line 130 as previously indicated.

The synchronizing pulses from AND circuit 444 are also utilized by virtue of their connection over line 452 to AND circuit 454, to cause circular shift of the arithmetic register. In order to gate the synchronizing pulses to the appropriate register, the selected output line from translator 338, which in this case is line 394, is connected to AND circuit 454 via OR circuit 456. Thus, an arithmetic register is caused to circularly shift and present its information to the otherwise enabled AND circuit 396, thereby causing a write operation into general storage 308. As in the case of the general storage readout AND circuit 286, the general storage write AND circuit 396 may be considered a multiple AND circuit with line 394 from translator 338 being considered a trunk line. In this manner, the contents of the different arithmetic registers may be specified and transferred to general storage 308.

Period 4 in Table I is thereby fully satisfied since W has been transferred to MAR, and R has been transferred to general storage.

*Period Five Operation*

In period 5, Table I calls for four separate operations including the switching of holding register 56, transfer of (PAK) to MAR, incrementing PAK +1, and the transferring to HR 56 of another instruction word. To accomplish this, the enable signal present on line 236 in FIGURE 8 is utilized. Such an enable signal is present in period 5 as long as the OP register 222 in the instruction word register 220 contains at least one binary "1" in one of its flip-flop stages. With reference now to FIGURE 7B, it will be seen that line 236 from decoder 48 not only is connected to cause gating of TP–5 through AND circuit 238 and thereby causing holding register 56 to switch, but also is connected to line 404 to cause gating of the period enable P–5 through AND circuit 406 to line 408. The enable on line 408 is utilized in FIGURE 8 in two separate places. One is an input to OR circuit 278 via line **408*a*, and the other is to OR circuit 410 via input line 408*b*. The input on 408*a* causes partial enablement of AND circuit 288 which is otherwise enabled by TP–5 to OR circuit 292 causing an enable on line 298 as previously explained. The synchronizing pulses thus issued from AND circuit 288 are connected by line 412 to the program address counter PAK 414 causing a circular shift of the contents thereof. The input on line 408*b* is directed via OR circuit 410 and OR circuit 416, to AND circuit 418 to allow passage therethrough of (PAK). In this manner, (PAK) is gated to MAR 306 via OR circuit 302 and line 304**.

At the end of the transfer of (PAK) into MAR, the address transfer counter 290 provides an end pulse, as previously described, which is coupled by line 420 to AND circuit 422. Since the input signal on line **408*b* is also coupled to AND circuit 422, the end impulse from counter 290 is gated to PAK over line 424. This gated end pulse causes PAK to increment itself one decimal digit. It is to be understood that PAK is a three decimal counter which may contain any decimal number from 000 to 999. A pulse on line 424 causes (PAK) to be advanced +1 (decimal) for example from 300 to 301. Since the instruction words stored in general storage 308** are stored successively therein in numerical order, PAK acts as an automatic indexing means for causing readout of the successive instruction words. As will be later explained in detail, PAK may also be decreased by one (decimal), or otherwise modified so as to be reset or chained other than by +1. Note that the two binary storage indicators in the least significant stages of the address registers are not a part of the address counter, per se, i.e. the counter is a three decimal digit counter with two binary digits appended thereto which always contain 0's so that (PAK) will always indicate a general storage address. This arrangement facilitates programming and is not a limitation of the invention.

Thus (PAK) as inserted into MAR 306 always indicates a general storage reference and never a non-general storage address.

After (PAK) is inserted into MAR it is apparent that an enable signal is present on line 334 from flip-flop 330. Such an enable signal on line 344 is utilized in this instance to partially enable the instruction word readout AND circuit 426. When this AND circuit is so enabled in period 5, the period enable P–5 fully enables AND circuit 426 so that an instruction word from general storage 308 is passed therethrough to OR circuit 428 and thus to line 152 which is the instruction word input line for holding register 56 as shown in FIGURE 7B. To allow the instruction word to be written into HR–1 or HR–2, as the case may be, an enable signal is caused on line 194 by the period enable P–5 through OR circuit 430 in FIGURE 8.

Thus another instruction word is inserted into holding register 56 after the switching thereof by TP–5, followed by the transfer of (PAK) to MAR and the subsequent incrementing of (PAK).

*(HR) to Arithmetic*

From the foregoing, it is apparent that a full cycle of regular operation of the computer system in accordance with an invariable instruction has been performed. There are numerous variations which may occur in any given cycle even when invariable instructions are executed. That is, an invariable instruction may itself specifiy that the operation be different from that set forth above. For example, in either of periods 1 and 2, the respective U and V addresses may specify that holding register 56 is M from which an operand is to be transferred to the respective arithmetic registers A or B. When such is the case, the U or V address after insertion thereof into MAR 306, indicates a non-general storage reference. Therefore, one of lines 310 in FIGURE 8 carries a "1" signal so that no enable is present on line 314. Consequently, flip-flop 330 will provide an enable signal on line 460 since it is in its "0" state by virtue of a prior period resume on line 462. The enable signal on line 460 effects synchronizing pulses on line 452 which may be employed to shift the contents of holding register 56 circularly and thus to one or the arithmetic registers in the manner described previously under "Period Four Operation."

The translation of (MAR) as effected in translator 338 selects output line 464 which enables AND circuit 466. To cause an instruction word to be read out of the holding register, the enable on translator output line 464 is connected via line 470 to the readout enable line 208 in FIGURE 7B. Line 470 is also connected to line 472 in FIGURE 7B which latter line carries the enable signal to AND circuit 474, thereby gating the instruction word from one of the registers HR–1 or HR–2, as the case may be, from OR circuit 198 to the AND circuit output line 468. One of AND circuits 466 (FIGURE 8) and 474 (FIGURE 7B) can be eliminated since there is a duplication in function, but the circuitry is as illustrated for the purpose of clarity. In any event, an instruction word is transferred to the appropriate register in arithmetic unit 148 over line 471. As for the general storage read and write AND circuits 286 and 396, it is to be understood that more than one translator output line may be employed to cause gating of an instruction word to the different arithmetic registers, since in one instance the instruction word may be gated to register A, while in another instance it might be gated to register B.

*R to HR*

Another instance in which the operation of the computer system as described under the different period headings above might be different but still in accordance with an invariable instruction is in period 4 when holding register 56 is designated as M to which R is to be transferred. Under such a situation, the W address when inserted in MAR indicates a non-general storage reference by having a "1" in at least one of the least two significant binary digits thereof. The resultant enable signal on line 460 from flip-flop 330 is employed to gate the period enable P–4 through AND circuit 472, the output of which is passed through OR circuit 430 to the holding register writing enable line 194. At the same time, the translation of the W address after its insertion in MAR, causes an output signal on line 474 whereby AND circuit 476 is enabled by pass R as present on line 400 to OR circuit 428 and thus to the holding register information inuput line 152. To cause R to be present on line 400, the enable on line 460 from flip-flop 330 is utilized via AND circuit 434 (enabled also by a NOT P–O signal) and AND circuit 444, to cause synchronizing pulses on line 452 whereby the appropriate register in arithmetic unit 148 is caused to shift circularly as long as AND circuit 454 is fully enabled by coupling of the enable on line 474 via line 478 and OR circuit 456.

The insertion of R into holding register 56 in FIGURE 7B does not complicate the switching and reading and writing cycling described by Table III, as illustrated by Table IV.

TABLE IV

| Cycle | Period | FF188 | HR–1 | RH–2 |
|---|---|---|---|---|
| 1 | 0 | at "0" | Holds $IW_2$ | Read $IW_1$. |
|  | 5 | to "1" | Holds $IW_2$ | Write $IW_3$. |
| 2 | 0 | at "1" | Read $IW_2$ | Holds $IW_3$. |
|  | 4 | at "1" |  | Write $IW_R$. |
|  | 5 | to "0" | Write $IW_4$ | Holds $IW_R$. |
| 3 | 0 | at "0" | Holds $IW_4$ | Read $IW_R$. |
|  | 5 | to "1" |  | Write $IW_5$. |
| 4 | 0 | at "1" | Read $IW_4$ | Holds $IW_5$. |
|  | 5 | to "0" | Write $IW_6$ | Holds $IW_5$. |

In Table IV the operation in cycle 1 is the same as the corresponding cycle in Table III. However, in cycle 2, holding register 56 is designated as the memory unit to which R is to be transferred. This is done, as previously described, during period 4, and in the schedule set out by Table IV, HR–2 receives R which then is termed $IW_R$, the instruction word resultant. As previously indicated, each of registers HR–1 and HR–2 may be written into even though they contain an instruction word before the writing. That is, even though HR–2 is holding $IW_3$ during the first three periods of cycle 2, the writing thereinto of $IW_R$ presents no problem, since $IW_R$ is effectively written over $IW_3$. Because of the switching of flip-flop 188 and holding register 56 at the beginning of period 5 in cycle 2, HR–1 is written into so as to obtain the cycle 4 instruction word. During cycle 3, then, HR–1 holds $IW_4$, while $IW_R$ is read out of HR–2. The subsequent periods and cycles proceed then as previously described relative to Table III. The effect of transferring R to HR in any period 4 is then a substitution of $IW_R$ for one instruction word already held in holding register 56. Otherwise, the holding register operates in normal fashion.

*(PAK) Modified*

Still another instance wherein the operation set forth above under the different periods may be different in accordance with the invariable instruction word presented to decoder 48, is in period 4 when M is specified as PAK. In this case, the address indicated by the W section of the instruction word causes PAK to be reset or otherwise modified other than by one. In each of these instances the last two binary digits of W will not be "0," but one or the other or both will be "1" so as to prevent full enablement of AND circuit 316. Therefore, an enable signal will be present on line 460 from flip-flop 330 to cause synchronizing pulses to be gated over line 452 and to cause circular shift of the arithmetic register containing the desired resultant R. In one type of modification of (PAK) the circular shift of the appropriate arithmetic register is employed, while in another it is not, depending on whether the translation of the W address via MAR causes an enable signal on line 480 or line 486. In the former case, AND circuit

482 is enabled to pass the resultant R on line 400 from its arithmetic register to PAK over line 484. This causes PAK to change to the number specified by R. If the translated address causes an enable signal on translator output line 486, a signal is conveyed to PAK over line 488 and causes PAK to be reset to a given number, e.g., 130. In either of the two cases wherein PAK is modified by an enable signal on translator output lines 480 or 486, the enable signal is passed via OR circuit 490 and line 492 to the "1" input side of flip-flop 494.

The modification of PAK by either of these two methods changes the sequence of events in the following cycle during period 0 by adding those actions above referred to in Table II. Before considering Table II, it must be remembered that after (PAK) is modified during period 4, that period 5 intervenes before period 0. However, the intervening period 5 is no different in operation than that above described since the OP section of decoder register 220 still contains an OP code which continues to cause an enabling signal to line 236 from OR circuit 234 in the decoder. Consequently, lines 408*a* and 408*b* in FIGURE 8 carry an enabling signal causing (PAK) as modified in period 4 to be read into MAR and translated so as to cause a new instruction word from general storage output line 344 to be gated through AND circuit 426 to the holding register input line 152. The holding register enable line 194 is also provided with an enabling signal as previously described.

Table V sets forth the operation of holding register 56 for five different cycles, the first of which is the same as in Tables III and IV, while during the second (PAK) is modified in period 4.

TABLE V

| Cycle | Period | FF188 | HR-1 | HR-2 |
|---|---|---|---|---|
| 1 | 0 | at "0" | Holds $IW_2$ | Read $IW_1$. |
| | 5 | to "1" | Holds $IW_2$ | Write $IW_3$. |
| 2 | 0 | at "1" | Read $IW_3$ | Holds $IW_3$. |
| | [1] 4 | | | |
| | 5 | to "0" | Write $IW_{PM1}$ | Holds $IW_3$. |
| 3 | 0 | to "1" | Read $IW_{PM1}$ | Write $IW_{PM2}$. |
| | 5 | to "0" | Write $IW_{PM3}$ | Holds $IW_{PM2}$. |
| 4 | 0 | at "0" | Holds $IW_{PM3}$ | Read $IW_{PM2}$. |
| | 5 | to "1" | Holds $IW_{PM3}$ | Write $IW_{PM4}$. |
| 5 | 0 | at "1" | Read $IW_{PM3}$ | Holds $IW_{PM4}$. |
| | 5 | to "0" | Write $IW_{PM5}$ | Holds $IW_{PM4}$. |

[1] (PAK) Mod.

From Table V it becomes apparent that the instruction word obtained in cycle 2 as caused by the modification of (PAK) is written into HR-1 (although it would be written into HR-2 if the roles of HR-1 and HR-2 in cycle 1 were reversed). The new instruction word obtained from modified (PAK) in period 5 of cycle 2 is termed $IW_{PM1}$. Since during cycle 2 HR-2 is holding $IW_3$ which is the instruction word successive to $IW_2$ and is not related successively to $IW_{PM1}$, it is necessary to replace $IW_3$ in HR-2 with the instruction word called for by (PAK) as incremented +1 (decimal) after the writing operation in period 5 of cycle 2. This is where the operations indicated in Table II are brought into effect so as to cause $IW_{PM2}$ to be written over $IW_3$ in HR-2.

The first command or action listed in Table II for period 0 is the switching of holding register 56. It will be recalled that during the prior period 4 when (PAK) was modified, the flip-flop 494 in FIGURE 8 was set to its "1" side. This provided a "1" enable on flip-flop output line 496 which remains until flip-flop 494 is set to its "0" side by an input on line 497. Such a signal on line 497 does not occur until later in period 0 as will be presently described. Flip-flop 494, line 496, and its "1" output AND circuit 498, are all shown in both FIGURES 7B and 8. The enable from flip-flop 494 gates timing pulse TP-0 from line 500 to line 502. This accomplishes two purposes one of which is illustrated in FIGURE 7B by the line 502 being connected via line 504 to OR circuit 248 the output of which is carried on line 190 to cause toggling of the holding register selector flip-flop 188. The holding register 56 is thereby switched again; i.e., twice: once in period 5 following a (PAK) modification and in the first period 0 thereafter.

The other function of gating TP-0 through AND circuit 498 is shown in FIGURE 8. Line 502 is connected to line 294, thereby gating TP-0 to OR circuit 292 to cause initial setting of address transfer counter 290. At the same time, the "1" enable on flip-flop output line 496 is connected via line 506 to cause gating of the period enable P-0 through AND circuit 508. The output of AND circuit 508 is directed by line 510 to OR circuit 416 to enable AND circuit 418. The output from AND circuit 508 is also conveyed vai line 512 to OR circuit 278 to cause circular shift of (PAK) via line 412. (PAK) is thereby read out through AND circuit 418 and into MAR 306 via OR circuit 302 and line 304. When the transfer of (PAK) to MAR is complete, it is necessary to cause PAK to be incremented +1 (decimal). This is accomplished by the aforementioned end pulse from counter 290 as it appears on line 420 being gated through AND circuit 514 by the gated period enable pulse P-0 as preesnt on line 516 which connects with line 510. Thus, (PAK) is incremented and the first three items of Table II are accomplished.

The fourth operation in Table II to be accomplished is the transfer of another instruction word to holding register 56. In conformance with Table V, it will be apparent that the period 0 of Table II is the period 0 of cycle 3 in Table V, and that $IW_{PM2}$ must be inserted in HR-2 during period 0. It will be assumed that (PAK) upon insertion into MAR during period 0 indicates a general storage reference, i.e., that $IW_{PM2}$ is to be obtained from general storage 308. This will usually be the situation, and circuits for obtaining $IW_{PM2}$ therefrom only are shown.

The least two significant binary digits of (PAK) always indicate general storage by both being "0" and when (PAK) is in MAR the signals cause an enable signal on line 314, AND circuit 316 is enabled by the "1" output of flip-flop 320 and the determination of coincidence by a signal on line 324 thereby causing an enable on flip-flop output line 334. This partially enables AND circuit 518. The other enable for AND circuit 518 is present on line 520 when AND circuit 522 is fully enabled by a period enable P-0 on line 440 and an enable on line 524 from the "0" output side of flip-flop 494. Flip-flop 494 is set to its "0" side by the flip-flop enable on line 334 as it passes through OR circuit 432 over line 526 to AND circuit 428 which is otherwise enabled by the period enable pulse P-0 to pass sync pulses to line 498. In this manner AND circuit 522 is fully enabled as is AND circuit 518. The latter circuit provides an enable on line 530 to gate $IW_{PM2}$ through AND circuit 532, thence through OR circuit 428 to the holding register input line 152. The output from AND circuit 518 is also passed through OR circuit 430 to line 194 which is the holding register writing enable line.

Thus it is seen that another instruction word is transferred to holding register 56, and this in period 0 in accordance with Table V (cycle 3). This instruction word $IW_{PM2}$ is written over $IW_3$, as previously described, and is held by HR-2 until called for in period 0 of cycle 4. It is to be noted that in the cycle 3 period 0 of Table V that $IW_{PM1}$ is read from HR-1. As previously shown, reading into and writing from register 56 may occur simultaneously, and this is the situation since as per Table I it is also necessary to transfer (HR) to the decoder during period 0. This is accomplished by utilizing the "0" enable from flip-flop 494 (FIGURES 7B and 8) over line 212 to enable AND circuit 210 as previously described. Thus, because of the extra holding register switch in period 0 as above described, $IW_{PM1}$ is read out of HR-1

(rather than HR–2 as would normally be the case in accordance with Table I) while $IW_{PM2}$ is written into HR–2.

With reference to Table V it will be apparent that after the modification of (PAK) in cycle 2 and the insertion of the two successive PAK modified instruction words in the holding register in period 5 of cycle 2 and in period 0 of cycle 3, that the holding register operates in normal fashion thereafter as per cycles 4 and 5 shown in Table V.

*Variable Instruction Execution*

As previously indicated, the execution of an instruction word representing a variable instruction by its OP section, calls plugboard 52 of FIGURE 6 into operation. That is if the OP section of an instruction word represents a number from 51 to 99, there is no output signal in any one of the lines in channel 64, but one of the lines in channel 62 is selected. Additionally, means are provided enabling the operator to vary the instruction sequence indicated by the OP section of the instruction word. In this embodiment a separate OP code is used to cause the relay translator 232 of FIGURE 8 to energize or de-energize relay solenoid 86. For example, OP codes 98 and 99 may be arbitrarily designated to cause a change in the selector apparatus, thereby varying the interpretation of the OP codes which designate the plugboard defined instructions.

Each of relay switches 550, 552, 554, 556, 558, 560, 562, 564, 566, 568, 570, 572 and 574 in FIGURE 7A is shown in its de-energized position, while the alternate position is that which the switches assume when relay circuit 551 is energized via translator 232 of FIGURE 8. When OP=98, an enable signal is present on line 260 from relay translator 232, while when OP=99, output line 262 carries an enable. With reference to FIGURE 4, it is noted that these enables may be patched via hubs 553 and 555, respectively, to AND circuits 557 and 559. When either of the AND circuits is so enabled, a synchronizing pulse is passed therethrough to flip-flop 561. When OP=99, an enable signal is produced from the flip-flop to allow conduction through triode 563. With one of the solenoid terminals 90 being patched through hubs 565 to B+ and the other terminal being patched through hubs 567 to the plate of triode 563, the cathode of which is grounded, solenoid 86 is energized, thereby changing each of the switches in FIGURE 7A to its non-illustrated position. When OP=98, and the resulting enable on line 260 is patched to AND circuit 557, solenoid 86 is de-energized.

Instruction words with OP equaling 98 and 99 are programmed and patched as desired by an operator to switch the relay switches. It is to be understood that the programming thereof is such that solenoid 86 may be switched while one or more invariable instructions is or are being executed, according to the time necessary for the relay to operate.

Alternative to using OP codes 98 and 99, is the use of a third decimal character in the OP section to cause an arbitrarily selectable change in the OP code interpretation by each instruction word. Thus, in computers having a plurality of selector relays, such relays can be addressed or selected by the indicator in the same manner as OP code 99 selects relay solenoid 86. That is, if an additional decimal digit were added to the OP section of the instruction word, 0 could indicate no switching while the numbers 1 through 9 could indicate energization or de-energization of one of a plurality of arbitrarily selected relays in the plugboard.

In either of these manners, the operator then causes selection of the OP code section. One advantage is that in the program of instructions, branch instructions can be used to detect computed quantities which may tend to become too large for the electronic registers in the machine, thereby indicating that it is then desirable to include Round-Off, for example, in the program to maintain computational accuracy. The branch instruction can cause the program to select the proper OP code by addressing the proper memory address as previously described. Thus the program of instructions can be modified without re-writing or selecting an alternate sub-program sequence of instructions, but by merely causing the interpretation of the instruction word to be modified. In this manner, the time required to access general storage for additional instruction words is eliminated, providing a faster operating computer.

Although there may be many lines in channel 62 issuing from decoder 48, only two lines 252, 254 are utilized in FIGURE 7B for illustrative purposes. In the subsequent description of the operation of the plugboard comprising generally the illustration of FIGURE 7A, four different functional sequences will be described. These are the four listed in Table VI.

*Table VI*

| Sequences Performed | OP No. | Channel Line Selected | Relay Switches |
|---|---|---|---|
| Multiply-Add | 58 | 252 | As shown. |
| Multiply-Accumulate-Step | 63 | 254 | Do. |
| Multiply-Add with Norm and Round-Off. | 58 | 252 | Reversed. |
| Round-Off without Norm | 63 | 254 | Do. |

For convenience, each of the functional sequences performed, are basically given the OP number shown in Table VI. The line from the OP translator in the decoder which is selected in channel 62 is listed in Table VI, along with the position of the switches controlled by relay switches. The OP numbers listed are arbitrary selections. All the functions listed in Table VI are based on the OP number of an instruction word in the decoder, but as will become apparent, each of these functions are otherwise determined by the plugboard patching as will be apparent in discussion of FIGURE 7A. Since each of the sequences listed in Table VI is basically the result of a given OP number, and since the instruction word containing this OP number is transferred into the decoder 48 in FIGURE 7B during a period 0, the variable instruction sequences there following due to the OP number stored in the decoder, will begin with the results obtained by the OP translation in period 0 as acted upon in the following period 1.

*Multiply-Add Sequence*

As indicated by Table VI, an OP number 58 causes line 252 in channel 62 from decoder 48 to be selected, i.e., to have an enable signal thereon. As shown in FIGURE 7B, this enable gates TP–1 through AND circuit 576 to line 578. By virtue of the coupling of this line to OR circuit 580, a signal is provided on line 582 which causes erasure of the OP number in the decoder. With reference to FIGURE 8, it will be apparent that the signal on line 580 sets each of the flip-flops in the OP register 222 to "0." This causes the OP register to be 00 in decimal terms, and by virtue of each flip-flop "1" line from the OP register being connected to OR circuit 234, the signal on line 236 is sufficiently low to prevent enablement of either of the AND circuits 238, 406 in FIGURE 7B. Therefore, it becomes further apparent that holding register 56 is not switched during the subsequent period 5, nor is PAK read out during that time.

Simultaneous with the erasure of the OP number TP–1 as gated to line 578 in FIGURE 7B is coupled via line 584 to OR circuit 586 in FIGURE 7A, and thence to the "1" input side of the "multiply" flip-flop 588.

The output enable on line 590 from this flip-flop then causes multiplication in the following manner. The period 1 enable P–1 still exists and is gated by the enable on line 590 through AND circuit 592 to hub 594 which is patched to hub 596 as shown. The output from hub 596 is on line 598 and is utilized to cause a memory reference at the address U stored in the U section 224

(FIGURE 8) of the decoder register 220. This is accomplished in the same manner as previously described, since line 598 in FIGURE 7A is coupled to OR circuit 270 in FIGURE 8. At the end of the transfer of the operand (multiplicand) into arithmetic register A, a resume pulse from transfer counter 154 is issued on line 130 which is one of the resume input lines to OR circuit 128 (FIGURE 5), thereby causing period 2 pulses to begin.

*Multiply cycle, period 2.*—During this period the second operand is obtained by the enable on line 590 (FIGURE 7A) gating P–2 through AND circuit 600 to patched hubs 602 and 604. Line 606 from hub 604 is connected to OR circuit 354 in FIGURE 8 and consequently causes a readout of address V in register 226 in the same manner as previously described, as well as causing a transfer of the operand (multiplier) specified by the address to register B in arithmetic unit 148.

*Multiply cycle, period 3.*—In this period, the contents of arithmetic registers A and B are caused to be multiplied. This is accomplished by connection of the enable on line 590 to hub 608, and by patching this hub to hub 610 which is permanently connected by line 612 to OR circuit 374 in FIGURE 7B. This allows gating of the period enable P–3 through AND circuit 376. As previously explained, the output on line 378 causes a multiplication operation to be performed in the arithmetic unit 148 with the product being produced in arithmetic registers C and D.

*Multiply cycle, period 4.*—Since the contents of register C is to be utilized in the next cycle by causing addition thereto in accordance with the Multiply-Add sequence to be performed, there is no need to store any of the arithmetic operands in general storage or elsewhere. Therefore, the Multiply cycle is hastened by suppression of the period 4 enable P–4. This is accomplished by gating P–4 itself through AND circuit 614 by the enable on line 590. The output of this AND circuit is connected permanently to hub 616 which is patched to hub 618. The latter hub is connected permanently to OR circuit 134 in FIGURE 5 by the suppression line S–1. As before discussed, an input to OR circuit 134 steps ring counter 122 to its next stage, thereby suppressing the current period enable and causing the next successive enable along with a timing pulse. In the instant situation in FIGURE 7A, the period 4 pulse P–4 is suppressed, and the period 5 timing pulse TP–5 and enable P–5 are caused to occur.

*Multiply cycle, period 5.*—In this period, only TP–5 is employed gating same through AND circuit 620 by the flip-flop enable on line 590 to hub 622 and also to the "0" input side of flip-flop 588. The enable on line 590 thereby ceases. Hub 622 is patched to hub 624 which is permanently connected to OR circuit 626 for setting the ADD flip-flop 628 to its "1" side, and to the period suppress line S–2 which connects to OR circuit 134 in FIGURE 5 and ends period 5.

*Add cycle, period 0.*—With the suppression of period 5 of the last cycle, P–0 of the second cycle occurs. However, nothing is to be done during this period, so P–0 is gated via AND circuit 630 by the "1" enable on the flip-flop output line 632 to cause a suppression of period 0. The gated P–0 is conveyed to suppression line S–3 via patched hubs 634 and 636.

*Add cycle, period 1.*—Since the purpose of this cycle is to cause addition to the most significant product half of the operand indicated by address W, it is necessary to obtain the operand so indicated and place same in register A. To implement this, P–1 is gated via AND circuit 638 by the enable on line 632 to patched hubs 640 and 642. The latter hub is permanently connected by line 648 to OR circuit 384 to enable AND circuit 388 so that the W address may be read therethrough. In order to cause the W address to shift circularly and present itself to AND circuit 388, line 644 from hub 642 in FIGURE 7A also connects to the read OR circuit 278 in FIGURE 8. Consequently, the operand whose address is W is obtained and stored in arithmetic register A in any of the manners previously described.

*Add cycle, period 2.*—Since register B in the arithmetic unit still contains the V address operand and since it is desired to add (A) to the most significant product half which is in arithmetic register C, a shift of (C) to register B is necessary. Consequently, P–2 is gated through AND circuit 650 by the enable on line 632 to the patched hubs 652 and 654. The latter hub is permanently connected to line **898*d* which is one of the lines in trunk line 898** in FIGURE 6. The signal thereon causes (C) which is the most significant product half to be shifted into arithmetic register B in conventional fashion.

*Add cycle, period 3.*—For the addition process the enable on line 632 is patched from hub 656 to hub 658 which is permanently connected to line 660 and to OR circuit 366 in FIGURE 7B. P–3 is consequently gated to line 370 to cause the addition of (A) and (B) to form a sum in arithmetic register D in the manner previously indicated.

*Add cycle, period 4.*—The purpose of this period is to cause a storage of the sum in arithmetic register D at the location indicated by address W. P–4 is consequently gated to AND circuit 662 by the enable on line 632 through patched hubs 664, 666 and to switch 550. Since for a Multiply-Add sequence, switch 550 is in the position illustrated, the gated signal is passed to hub 668 which is patched as shown to hub 670. This latter hub is connected permanently via line 672 to two different OR circuits in FIGURE 8. One of these is OR circuit 646 which has an output line 648 connected to OR circuit 384 to cause enablement of AND circuit 388. The other FIGURE 8 circuit connected to the hub output line 672 is OR circuit 392. The W address is thereby caused to be transferred to MAR 306 in a manner previously described, and by virtue of the output line 398 from OR circuit 392, the general storage write AND circuit 396 is partially enabled rather than its readout AND circuit 286. The sum resulting in period 3 is thus stored in general storage.

*Add cycle, period 5.*—At the beginning of this period, P–5 is gated through AND circuit 674 in FIGURE 7A by the enable on line 632 to switch 522 via patched hubs 676 and 678. With switch 552 in its illustrated position, gated P–5 is directed through patched hubs 680 and 682, the latter of which is connected permanently to line 686. This line connects directly to OR circuit 688 whose output line 684 is permanently connected to OR circuit 242 (FIGURE 7B) as an input line thereto so that the gated P–5 pulse sets flip-flop 214 to its "1" side to allow an internal reference to be made to the holding register 56 in the subsequent period 0. The gated P–5 on line 684 upon passing OR circuit 248 also is directed by line 246 to line 190 and causes switching of flip-flop 188. Holding register 56 is then ready to have another instruction word written thereinto, but since the OP section of the decoder has been erased or set to zero, the output decoder line 236 does not carry an enable for AND circuit 406. Therefore, (PAK) must be read out to cause a new instruction word to be obtained in a manner other than by the normal enable on line 408 (lines **408*a* and 408*b* in FIGURE 8). To accomplish this, P–5 as gated through AND circuit 674 in FIGURE 7A is coupled via switch 552 to hub 680 which is connected directly by line 690 to two different OR circuits in FIGURE 8. One of these is OR circuit 410 and the other is OR circuit 278. With these OR circuits being so connected, the respective AND circuits 418 and 288 are enabled to cause the contents of PAK to be inserted in MAR so that the next instruction word may be obtained in accordance with the adress indicated by PAK and be written into the holding register during period 5**.

The add flip-flop 628 in FIGURE 7A is then set to its "0" side by the following timing pulse TP–0. During this 0 period, another instruction word is read from the holding register into decoder 48, and this new instruction word in accordance with the encoding of the OP section thereof determines what operations are to be subsequently performed.

*Multiply-Accumulate Step*

An instruction of this sort is basically determined by having the OP section of the instruction word corresponding thereto represent the decimal number 63 in accordance with the examples previously explained. The decoding, as previously described occurs during period 0 and causes an enable, in this case on line 254 in channel 62 from decoder 48 in FIGURE 7B. It is assumed the relay switches of FIGURE 7A remain in their illustrated position.

*Compare cycle, period 1.*—The enable on line 254 gates TP–1 through AND circuit 692 to line 694. This line is connected to OR circuit 580 and consequently to line 582 which causes erasure of the OP number in the decoder register by setting all the OP flip-flops to 0, as previously explained. Line 694 is also connected by line 696 to the "1" input side of flip-flop 698 via OR circuit 700. The resulting enable on flip-flop output line 702 indicates that a comparison is to be made between two different operands which are obtained during periods 1 and 2 of this cycle. To obtain the first operand, P–1 is gated by the enable on line 702 through AND circuit 704 to patched hubs 706, 708 and to switch 568. With the switch in the illustrated position, the gated pulse is passed between patched hubs 710 and 712 to line 714. As will be noted in FIGURE 8, line 714 connects to MAR 306 and to OR circuit 278. By the former connection, MAR is set to a given address, e.g., 002. This is an address which is predetermined to indicate a given operand in general storage 308. By virtue of the connection of line 714 to OR circuit 278, an end pulse is produced from counter 290 to allow a general storage reference to be made. In this manner, the operand located at the fixed address 002 is obtained and gated through the general storage readout AND circuit 286 to the arithmetic register A.

*Compare cycle, period 2.*—In this period, P–2 is gated via AND circuit 716 through patched hubs 718 and 720, switch 566, and patched hubs 722 and 724 to line 726. This line also is directly connected to MAR 306 in FIGURE 8 and indicates that MAR is to be set to another fixed address, e.g., 996. This address signifies that a non-general storage reference, and in particular a reference to the holding register is to be made for transfer of (HR) to arithmetic register B. Consequently, from the translation of this address in translator 338, the translator output line 464 is enabled so as to cause the transfer in the manner heretofore described.

*Compare cycle, period 3.*—Since the operands are now in their respective arithmetic registers A and B, the process of comparing these two operands is performed during this period. To accomplish this, the enable on line 702 is coupled by patched hubs 728 and 730 to line 732 and thence to AND circuit 734 in FIGURE 7B. P–3 is thereby gated to line 736 and initiates a comparison process in the arithmetic unit 148 in a manner well known in the art.

*Compare cycle, period 4.*—Since the result of the comparison is to be utilized subsequently, no storage thereof is necessary. Consequently, P–4 is gated through AND circuit 738 to patched hubs 740 and 742, the latter of which is permanently connected to suppression line S–5 of the OR circuit 134 (FIGURE 5).

*Compare cycle, period 5.*—At the beginning of this period, TP–5 is gated via AND circuit 744 to the "0" input side of the comparison flip-flop 698, thereby ending the enable on output line 702. TP–5 is also gated to patched hubs 746 and 748 to a period suppression line S–6 and to OR circuit 750 to set the branching flip-flop 752 to its "1" side.

*Branch cycle, period 0.*—A new cycle is thus established, and during this cycle a branching operation is accomplished in accordance with the result of the comparison performed in the last cycle. There are three possible types of results from the comparison cycle, each of which are utilized, when they occur, in the branching cycle to determine what operations are to follow. If (A) and (B) were equal during the comparison cycle an enable signal is present on line **754*a* which is one of the lines in trunk line 754 of FIGURE 6. If the comparison in the prior cycle indicates that (A) is less than (B), an enable signal is present on line 754*b*, another of the lines in trunk line 754 of FIGURE 6. A third line in trunk line 754 is line 754*c*** which carries an enable signal if (A) was found to be greater than (B) in the comparison cycle.

*$(A)>(B)$.*—In this case, which is usually the situation at least following the first comparison with the constant designated by address 002, AND circuit 756 is fully enabled by the signal on line **754*c* in conjunction with the enable from flip-flop output line 758, to gate TP–0 to patched hubs 760 and 762, the latter of which is connected permanently to OR circuit 764. Flip-flop 766 is consequently set to its "1" side to cause an enable on its output line 768. Thus ends the branching function when (A) is found to be larger than (B). The branching cycle may be ended by setting flip-flop 752 to its "0" side during period 0 by gating P–0 (or TP–0, if desired) through AND circuit 770 to flip-flop 752. The output of AND circuit 770 also is coupled to patched hubs 772 and 774, the latter of which is permanently connected to suppression line S–7. In the alternative, branch flip-flop 752 may be set to its "0" side by gating a latter occurring pulse, such as TP–5, through AND circuit 770, but in this case the branching period 0 would need to be suppressed by additional circuitry connected to enable line 768**, for example, in the manner previously described to cause suppression of a period enable.

*$(A)<(B)$.*—If during the comparison cycle, (A) is found to be less than (B), an error someplace along the line has been committed. Therefore, the signal on line **754*b* in conjunction with the enable on the branch flip-flop output line 758, gates TP–0 through AND circuit 782 to switch 562 via patched hubs 776 and 778. With switch 562 in the position illustrated, an error signal is caused on line 780** via the patched hubs as shown. This error signal stops the computer operation in a manner well known in the art.

*$(A)=(B)$.*—If the contents of registers A and B when compared in the previous cycle are found to be equal, the signal on line **754*a* in conjunction with the enable on line 758 gates TP–0 through AND circuit 786 to switch 564 via patched hubs 788 and 790. The illustrated position of switch 564t directs the gated TP–0 signal through patched hubs 792 and 794 to OR circuit 796 which is connected to the "1" input side of flip-flop 798 thereby causing an enable signal on its output line 800**. Normally during the first time that (HR) is compared with the constant whose address is 002 during the comparison cycle, (A) is not found to be equal to (B). Consequently, the operation of returning control from the plugboard back to the next instruction word will be later described and the situation where (A) is found to be greater than (B) will now be continued.

*Add constant, period 1.*—The purpose of this cycle is to cause +1 (decimal) to be added to each of the U and V sections of the instruction word acquired from the holding register and previously compared. It may now be further indicated that the constant which was obtained in period 1 of the compare cycle when the comparison flip-flop was enabled, was equal in decimal terms to 63 $U_n$ $V_n$ W which is the symbolic representation of the instruction word corresponding to the "*n*th" execution of the Multiply-Accumulate Step instruction. It will be noted that the OP section of this constant is 63 which corresponds to the OP number required to accomplish this instruction. W in the above constant is the same as W in the instruction word which was obtained from the holding register during period 2 of cycle 1 of this instruction. Therefore, it is apparent that the U and V sections of the instruction word are effectively the only sections thereof which cause a comparison result. Therefore, it is to each of these sections that a +1 is added in this Add Constant cycle, so that on a subsequent comparison there is a possibility of the U and V sections being equal to the fixed constant above mentioned. To accomplish addition of +1 to the U and V sections, P–1 is gated by the enable on line 768 through AND circuit 802 to switch 554 via patched hubs 804 and 806. With switch 554 in its illustrated position, a signal is passed through patched hubs 808 and 810 to line 812. This line is connected to MAR 306 in FIGURE 8 and to OR circuit 278. MAR is thereby set to a predetermined address, for example 002, which causes a general storage reference to constant 000 001 001 000 which is then read out and placed in arithmetic register A.

*Add constant cycle, period 2.*—Since (HR) is already in arithmetic register B, and no other transfer of an address or information is to be made during this period, the period is suppressed by gating of P–2 through AND circuit 814 to suppression line S–3 via the patched hubs as shown with switch 556 being in the illustrated position.

*Add constant cycle, period 3.*—The arithmetic process to be performed during this period is that of addition. Consequently, the enable on line 768 is coupled via patched hubs 816, 818 to line 660 and initiates the addition via OR circuit 366 (FIGURE 7B) and AND circuit 368.

*Add constant cycle, period 4.*—The purpose of this period is to cause the result of the addition to be recorded in holding register 56. Therefore, P–4 is gated via AND circuit 820 in line 822 via the patched hubs and switch 558 as illustrated. Line 822 connects to MAR 306 in FIGURE 8 and causes a setting therein of a given address, e.g., 997. This is the address which when translated signifies that R (the sum, in this case) is to be transferred to holding register 56. Consequently, translator output line 474 is selected and enables the AND circuits coupled thereto in the manner previously explained to cause the sum to be stored in HR–1 or HR–2 as the case may be.

*Add constant cycle, period 5.*—The TP–5 is gated via AND circuit 824 to cause setting of the "add constant" flip-flop 756 to its "0" side and thereby end the enable on line 768. The output of AND circuit 824 is also coupled via patched hubs 826, 828 to switch 560, which when in its illustrated position directs the gated pulse to line 830 via the patched hubs 832 and 834. Line 830 connects to OR circuit 586 and the gated TP–5 pulse sets the "multiply" flip-flop 588 to its "1" side.

*Multiply cycle.*—This cycle operates in the same manner as previously described for the operation of a multiply cycle when flip-flop 588 is at its "1" side and the operands obtained during periods 1 and 2 thereof are those specified respectively by the U and V addresses of the instruction word still in the decoder and which causes the Multiply-Accumulate Step to be initiated, it being understood that the sum resulting in cycle 3 was stored in HR–1, assuming HR–2 was the register from which the original variable type instruction word was obtained.

*Add cycle.*—This cycle is the same as the ADD cycle previously described when flop-flop 628 provided an enable on line 632 with no exceptions, control being returned from the plugboard by a signal on line 686 causing an internal reference to holding register 56.

Since the next instruction word to be read out of holding register 56 during the subsequent period 0 is that which was stored therein during period 4 of this Add Constant cycle as above mentioned, the OP section thereof is still the same because only the U and V sections were changed. Therefore, during the subsequent period 1, decoder output line 254 is again selected and the comparison operation is again performed. If the result of the comparison still shows (A) to be greater than (B), +1 is again edded to the U and V sections of the new instruction word, followed by the multiplication and addition sequences. This repetitive process is continued until (A) is found to be equal to (B) at which time "return" flip-flop 798 causes an enable on line 800 as previously described. During the cycle control by flip-flop 798, return to sequencing the operations by PAK and its associated circuitry is accomplished by causing internal reference to holding register 56 so as to obtain instruction words in accordance with (PAK).

*Return cycle, period 0.*—As will be recalled during explanation of the branching process, period 0 was suppressed, but this occurs after TP–0 is passed through the branch AND circuit 786 to cause an enable on the return flip-flop output line 800. Therefore, period 0 is not involved in the return cycle.

*Return cycle, period 1.*—The purpose of this period is to set PAK to a number corresponding to that which should be the address of the instruction word in the holding register to be read out during period 4 of this cycle. Since a Multiply-Accumulate Step sequence changes the contents of both HR–1 and HR–2 when more than one complete comparison operation is performed, it is necessary to insert in one of the individual holding registers the next instruction word to be used. With reference to Table III, and as previously described, it will be apparent that PAK must be diminished by 1 (decimal). Assume, for example, that the instruction word which originally initiated the Multiply-Accumulate Step sequence was $IW_3$ of Table III as read out of HR–2 in cycle 3. The acquisition of $IW_3$ in cycle 1, however, was immediately followed by incrementing PAK +1. This is the address which caused acquisition of $IW_4$ in cycle 2. However, after obtaining $IW_4$, PAK was again advanced +1 so as to be set for acquisition of $IW_5$. When control is returned to PAK, it is therefore necessary to diminish its contents by 1 so that its address will specify $IW_4$, rather than $IW_5$.

To accomplish this, P–1 is gated by AND circuit 836 to line 838 through the patched hubs as shown via switch 574 in its illustrated position. Line 838 connects to PAK in FIGURE 8 and causes (PAK) to be decreased by 1.

*Return cycle, periods 2 and 3.*—Nothing needs to occur during these periods, so each period enable may be suppressed by gating same to suppression lines in the manner heretofore described. For example, P–2 may be gated through AND circuit 840, the output of which is patched as illustrated in conjunction with switch 572 being in its illustrated position to suppression line S–9.

*Return cycle period 4.*—Now that PAK has been decreased by one (in period 1 above), it is necessary to transfer (PAK) to MAR and to obtain the new instruction word specified thereby. For these reasons P–4 is gated through AND circuit 842 to switch 570 through patched hubs 844, 846. With switch 570 in its illustrated position, the gated P–4 enable is coupled to line 848 via patched hubs 850, 852. Line 848 extends to three different places in FIGURE 8: (1) to OR circuit 278 to cause address transfer counter 290 to begin counting since it was previously set by TP–4; (2) to OR circuit 416 to enable AND circuit 418 to allow (PAK) to be transferred to MAR 306; and (3) to another AND circuit 854 which when fully enabled by a signal on flip-flop output line 334, enables AND circuit 856 to allow readout of another instruction word from line 334 through OR circuit 428 to the holding register input line 152. The output of AND circuit 854 is also connected by line 858 to AND circuit 860, thereby gating P–4 to line 424 to cause PAK to be incremented +1. This incrementing occurs after (PAK) has been transferred to MAR, since after such a transfer only is flip-flop output line 334 enabled. PAK is incremented in this manner rather than by use of an end pulse from address counter 290 since it is only during the return cycle that PAK is to be incremented during period 4. Thus, with reference again to Table III, it is seen that $IW_4$ is re-inserted into the holding register HR–1, it being recalled that during the discussion relative to period 1 of the return cycle that $IW_3$ of Table III was the instruction word which initiated the variable instruction entitled Multiply-Accumulate Step and that it is consequently necessary to re-insert in the holding register $IW_4$ and $IW_5$ before fully returning the control back to PAK and the holding register.

*Return cycle, period 5.*—The function to be accomplished during this period is, therefore, the insertion of $IW_5$ into the holding register. Since (PAK) was advanced +1 in period 4, the contents thereof specify the address and location of $IW_5$. Before obtaining the new instruction word, it is necessary to switch the holding register. Therefore, P–5 is gated via AND circuit 860 by the enable on line 800 to line 684 via patched hubs 862 and 864, the latter of which is connected permanently to OR circuit 688. The resulting signal on line 684, as previously described, causes flip-flop 188 to be toggled, thereby readying HR–2 to receive $IW_5$. This new instruction word is obtained by the gated P–5 being coupled in FIGURE 7A to line 868 which is directly connected to hub 864. Line 868 is connected directly with both of lines 408*a* in FIGURE 8 and to the line 408*b*. Thus, P–5 is gated to OR circuits 278 and 410 to cause (PAK) to be transferred to MAR. $IW_5$ is thus obtained in the usual manner for a period 5 acquisition of a new instruction word.

Thus ends the Multiply-Accumulate Step instruction sequence, and holding register 56 is readied for another period 0 instruction word readout which is accomplished in the same manner as heretofore described.

*Multiply-Add With Normalize and Round-Off*

When the OP section of an instruction word transferred into decoder 48 during period 0 is representative of the decimal number 58 and the relay translator 232 in FIGURE 8 has de-energized the relay solenoid 86 so as to cause all of the switches 550 through 574 (even numbers only) in FIGURE 7A to reverse their position, i.e., to move to their non-illustrated position. The OP number 58, however, still causes an enable on decoder output line 252 in channel 62 the same as for the Multiply-Add instruction. Consequently the Multiply cycle is the same as described above in the Multiply-Add sequence. The subsequent Add cycle is also similar to that previously described except that the sum is caused (by means not shown) to be set up in register C rather than register D, and in period 4, the period enable P–4 is gated to line 870 since switch 550 is in its leftward position. The function of the gated P–4 signal on line 870 is to cause the most significant product half in arithmetic register B (as placed there during period 2) to be stored in general storage at the address W for later use. Period 5 is also altered by virtue of switch 552 being at its leftward position. Therefore, P–5 as gated through AND circuit 674 is directed via patched hubs 878, 880 to line 882 which connects to OR circuit 884 causing flip-flop 886 to be set to its "1" side.

*Normalizing cycle.*—With flip-flop 886 set to provide an enable on its output line 888, a Normalize process is indicated to occur. This process well known in the art shifts the signals in a selected arithmetic register until the signal stored in the leftmost flip-flop thereof indicates a different binary value than the signal stored in the flip-flop to its immediate right. In decimal registers, the process causes signals to shift until the signal representing the most significant digit of the quantity in the register is in the left most character position of the register. This process is carried out automatically by the arithmetic unit upon receiving an appropriate signal in period 3. Since the operands involved in this process (i.e., the least significant product half in register D and the sum in register C) are already in their proper arithmetic registers and consequently no memory references need be made in periods 0, 1 and 2, these periods are suppressed by gating the respective period enables via AND circuits 890, 892, and 894 to suppression line S–11 via the patched hubs as shown. Commencement of period 3 is thereby hastened so that P–3 may be gated through AND circuit 896 to line 898*a* via patched hubs 900, 902 to cause the normalizing process to begin. Line 898*a* is one of the lines in trunk line 898 shown in FIGURE 6 between plugboard 52 and the arithmetic unit 148. Since the normalized results are to be utilized subsequently, no readout thereof to general storage is necessary. Consequently, P–4 is gated through AND circuit 904 via the patched hubs as shown to the suppression line S–11. In period 5, TP–5 is gated through AND circuit 906 to cause flip-flop 886 to be set to its "0" side, thereby ending the enable on line 888 and the normalize cycle. The output of AND circuit 906 is also conveyed over line 908 through patched hubs 910, 912. The latter hub is permanently connected to suppression line S–12 and to OR circuit 700, thereby causing the "compare" flip-flop 698 to be set to its "1" side.

*Round-Off Sequence*

This sequence may be initiated as just described in the last period 5, or may be initiated without the Multiply-Add-Normalize sequence by a direct input to OR circuit 700 as caused by an enable in channel 62 on the decoder output line 254. As will be noted from Table VI, the round-off sequence per se is initiated when the decoder contains an instruction word whose OP section represents the number 63. This causes line 254 to be selected, the same as does OP number 63 which represents Multiply-Accumulate Step, but each of the relay switches is then assumed to be reversed, i.e., in its alternate (non-illustrated) position. Regardless of which input to OR circuit 700 causes flip-flop 698 to provide an enable on line 702, a Round-Off sequence is initiated and same begins with a compare cycle, period 0 of which is suppressed (not shown) if it follows normalizing.

*Compare cycle, period 1.*—During this period it is necessary to acquire the contents of arithmetic register D which contains the least significant product half. To implement this, P–1 is gated through AND circuit 704 to switch 568. With this switch in its downward position, the gated signal is directed through patched hubs 920 and 922 to line 898*b*, another one of the lines in trunk line 898 shown in FIGURE 6. This causes (D) to be transferred to arithmetic register A.

*Compare cycle, period 2.*—During this period a constant specified by the address 003 for example, is acquired and inserted into arithmetic register B. P–2 is therefore gated through AND circuit 716 to switch 566 in its downward position and thereby through the patched hubs as shown to line 924. This line is connected in FIGURE 8 to MAR 306 and to OR circuit 278, thereby causing the operand at 003 to be obtained and inserted into register B.

*Compare cycle, period 3.*—Comparison of the contents of arithmetic registers A and B is accomplished in this period in the same manner as heretofore described. A signal is thereby caused to one of the branch AND circuit input lines 754*a*, 754*b* or 754*c* in accordance, respectively, with whether (A) was found equal to (B), (A) was found less than (B), or (A) was found greater than (B).

*Compare cycle, periods 4 and 5.*—These are the same as heretofore described, both periods being suppressed while TP–5 ends the comparison cycle and initiates a branching operation.

*Branch cycle, period 0.*—If in the comparison cycle (A) was found to be less than (B), TP–0 is gated through AND circuit 782 to switch 562 which in its downward position connects via hubs 926 and 928 to line 930, thereby causing an input to the return flip-flop 798.

In the Return cycle, with switches 570, 574 in their downward positions, periods 1 through 4 are suppressed, while period 5 causes the acquisition of a new instruction word before returning the operation to the holding register and PAK.

If (A) was found to be either equal to or greater than (B) during the comparison cycle, an Add Constant cycle is initiated. This is accomplished by gating the signal on line **754*a* to switch 564 which in its downward position connects via patched hubs 932, 934 to cause flip-flop 766 to be set to its "1" side. If (A) was found to be greater than (B), the signal on line 754*c* is gated to flip-flop 766. P–0 is suppressed via AND circuit 770** as heretofore described.

*Add constant cycle, period 1.*—Since (A) was not found to be less than (B) in the comparison cycle, it is necessary to add +1 to the most significant product half in order to accomplish round-off in accordance with the definition thereof. Therefore, P–1 is gated through AND circuit 802 to switch 554 which in its downward position causes a signal on line 936 via the patched hubs 938, 940 as shown. In FIGURE 8, line 936 connects to MAR 306 and to OR circuit 278. The signal on line 936 to MAR causes a predetermined address number, e.g., 004, to be set up therein. This address number signifies that the constant +1 is to be acquired from general storage and written into arithmetic register A. This is accomplished in a manner similar to that previously explained for similar situations.

*Add constant cycle, period 2.*—Since it is to the most significant product half that the +1 is to be added, and since such half was stored at address W during the prior Add cycle, P–2 is gated through AND circuit 814 to switch 556. In its downward position, this switch directs the gated signal via patched hubs 942 and 944 to line **644*a*. This line is connected (not shown) to line 644 in FIGURE 8 in as it enters OR circuit 646 and OR circuit 278**, thereby causing a transfer of address W and a consequent reading of the most significant product half which is stored at address W.

*Add constant cycle, period 3.*—Addition of the contents of arithmetic registers A and B is performed in this period in the same manner as heretofore described.

*Add constant cycle, period 4.*—During this period it is desired to store the sum obtained during period 3. Therefore, P–4 is gated through AND circuit 820 to switch 558 which in its downward position couples the gated signal by patched hubs 946, 948 to line **672*a*. It is to be understood that this line is connected to lines 672 in FIGURE 8 so that the gated signal goes to both OR circuits 392 and 646**. Storage of the sum at address W is thereby accomplished.

*Add constant cycle, period 5.*—During this period, TP–5 is gated as heretofore described to switch 560. Since this switch is in its downward position, the gated timing pulse is coupled to line 950 via patched hubs 952, 954. Line 950 is connected directly to OR circuit 796 which sets the return cycle flip-flop 798 to its "1" side. The return cycle then operates in the same manner as described previously in the case where (A) was found to be less than (B). The internal reference flip-flop 214 of FIGURE 7B is thereby set to its "1" side, the holding register selector flip-flop 188 is switched, and a new instruction word is inserted in the holding register.

Thus the round-off sequence is completed and the holding register is readied for the following period 0 and further sequences as may be directed by the instruction words stored therein.

Each of the different functional sequences listed in Table VI have thus been shown to be accomplished by the computer with the plugboard and the particular patching illustrated defining a program to be carried out in response to each variable instruction represented by its corresponding instruction word. It is to be understood that in reality, the control apparatus for a computer, in accordance with this invention, is much more complicated and complex than that illustrated and described. However, it is apparent that there is provided herein systems in which the various objects and advantages set forth relative to this invention are successfully achieved.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. In a digital computer, means for receiving a plurality of groups of electrical impulses each encoded at least in part in accordance with a first code or a second code and for decoding each impulse group as received, said means having a plurality of output channels, processing means controllable to perform any of a plurality of operations including at least arithmetic operations coupled to a first of said channels, a decoded impulse group previously encoded in accordance with said first code causing a signal in said first channel and thereby causing the processing means to perform one of said operations in accordance with a plan predetermined by said first code, and given means coupling a second of said channels to said processing means for receiving a signal produced in the second channel by an impulse group previously encoded in accordance with said second code and causing performance of at least one of said operations in accordance with a plan predetermined at least in part by said given means.

2. Apparatus as in claim 1 wherein said given means includes manual selection apparatus.

3. Control apparatus for use in a digital computer having processing means controllable to perform by respective operational sequences any of a plurality of operations including at least arithmetic operations upon receipt of given signals, comprising means for at least temporarily storing at least one encoded group of electrical signals encoded at least in part in accordance with a first code or a second code with each such group specifying a particular one of said operational sequences, means having a plurality of output channels for decoding said one signal group and providing a resultant signal in one of said channels if said group is encoded in accordance with said first code and a resultant signal in another of said channels if the group is encoded in accordance with said second code, means for coupling one of said channels to the processing means for allowing a resultant signal in that channel to control said processing means and thereby effect performance of one of said operations in accordance with the operational sequence specified by the respective decoded signal group, and given means coupling said processing means and another of said channels for allowing a resultant signal therein to control said processing means via said given means and thereby effect performance of at least one of said operations in accordance with an operational sequence predetermined at least in part by said given means.

4. In a digital computer having processing means controllable to perform by respective operational sequences any of a plurality of operations including at least arithmetic operations in accordance with a computer program designed to achieve a given computational result, means for storing a plurality of encoded groups of electrical impulses, each group designating a respective operational sequence and representing either an invariable instruction or a variable instruction, means coupled to the storage means and having a plurality of output channels for decoding the impulse groups individually to provide a signal in a first of the channels for a decoded invariable impulse group and in a second of the channels for a decoded variable impulse group, means coupled to said processing means and the first channel for allowing the successive signals therein to cause given ones of said operations to be performed invariably in accordance with the operational sequence designated by the corresponding invariable instructions, and given means coupling the second channel to said processing means for utilizing the decoded variable instruction signals in the second channel to cause operations to be performed at least in part in accordance with operational sequences designated by instructions predetermined by said given means.

5. In a digital computer having processing means controllable to perform by respective operational sequences any of a plurality of operations including at least arithmetic operations in accordance with an overall computer program designed to achieve a given computational result, first program means for storing a plurality of groups of electrical impulses in accordance with said computer program, all groups representing a respective operational sequence with some groups being encoded to represent invariable operational sequence instructions forming a given portion or portions of said program, other groups being encoded to represent variable operational sequence instruction forming the basis for another portion or portions of said program, means for decoding each of said impulse groups, means responsive to decoded invariable instruction type impulse groups for causing the processing means to perform given ones of said operations in an invariable operational sequence manner predetermined by the invariable instruction impulse groups, and second program means responsive to the decoded variable instruction type impulse groups for causing said processing means to perform operations in accordance with another portion or portions of said computer program per operational sequences predetermined at least in part by said second program means, the overall computer program being thereby executed in accordance with the combined program portions predetermined by said first and second program means.

6. Apparatus as in claim 5 wherein the second program means includes manual selection apparatus.

7. Apparatus as in claim 6 wherein the manual selection apparatus includes a plugboard.

8. Apparatus as in claim 5 wherein the decoding means has a plurality of output channels, one of which is coupled to the processing means for conveying thereto signals representing decoded invariable instruction type impulse groups, and another of which is coupled to said second program means for conveying thereto signals representing decoded variable instruction type impulse groups.

9. Apparatus as in claim 8 wherein at least certain of said impulse groups are each further encoded in accordance with a first or second code, said second program means including a plurality of two-position switches, relay means coupled to another of said channels and to each of said switches for operating same to one or the other of their two positions in accordance with said first or second code.

10. Apparatus as in claim 8 wherein each of the channels for carrying said signals resulting from the decoding of said different impulse groups includes a plurality of output lines, each impulse group being further encoded to cause a signal on one of said output lines, the output lines carrying the signals representing the invariable instruction type impulse groups being coupled respectively to the processing means for causing operations therein in accordance with said further encoding, the variable instruction type impulse groups causing a signal on one of the output lines in a channel coupled to the second program means and thereby effecting one of the plurality of programs predetermined by the second program means.

11. Apparatus as in claim 5 and further including means for transferring said impulse groups from the first program means to the decoding means sequentially, means for controlling the transfer means including means responsive to each decoded invariable instruction type impulse group for causing the transfer means to transfer another impulse group and means responsive to each decoded variable instruction type impulse group for preventing transfer of another impulse group during the programming of said operations by the second program means.

12. Apparatus as in claim 11 wherein the means for causing transfer of another impulse group includes means coupled between the decoding means and the transfer means and responsive to a signal produced by the decoding of at least a portion of each impulse group, the means for preventing transfer of another impulse group including means for eliminating the decoded signal.

13. Apparatus as in claim 11 wherein the transfer means includes means for at least temporarily storing at least one impulse group.

14. Apparatus as in claim 11 and further including means in said second program means coupled to the transfer controlling means for causing the transfer means to initiate transfer of another impulse group to the decoding means.

15. Apparatus as in claim 14 wherein each decoded impulse group provides a transfer signal, the means in said controlling means for causing transfer of another impulse group being coupled between the decoding means and the transfer means and being responsive to said transfer signal, the means for preventing transfer of another impulse group including means for eliminating said transfer signal, and the means in said second program means for initiating transfer of an impulse group including means for generating and conveying a second transfer signal to the transfer causing means.

16. In a computer, means for effecting a plurality of different operations in the computer, means for providing signals respectively representing instruction words each of which includes an operation designator indicative of a respective operational sequence for at least some of the said operations and further includes at least one operand designator, means for coupling at least one of said signals to the first mentioned means to effect thereby the sequence of operations indicated by said operation designator of the instruction word represented by said one signal, and means for coupling at least one other of said signals to said first means to cause said first means to effect a sequence of operations other than that indicated by said operation designator of the instruction word represented by said other signal itself.

17. In a computer, means for effecting a plurality of different operations in the computer, means for providing signals respectively representing instruction words each of which is indicative of a respective sequence for a respective certain of said operations, means for coupling at least one of said signals to the first mentioned means to invariably effect thereby the sequence of operations indicated by the instruction word represented by said one signal, and changeable means for coupling at least one other of said signals to said first means for varying the sequence of operations effected by the first means from the sequence indicated by the instruction word represented by said other signal.

18. In a digital computer, means for effecting a plurality of different operations in the computer, means for at least temporarily storing a plurality of groups of electrical impulses, said groups respectively representing instructions words each of which designates a respective group of said operations and indicates a predetermined operational sequence for the operations of its own group of operations, means for coupling certain of said impulse groups at different times as respective signals to the first mentioned means to invariably effect thereby at said different times and respectively the sequences of operations indicated by the instruction words respectively represented by the said certain impulse groups, and means changeable at least in part for coupling others of the said plurality of impulse groups at other different times as other respective signals to the said first means for modifying at will and respectively the sequences of operations effected at said other times by the first means from the said predetermined operational sequences respectively indicated by the instruction words respectively represented by the said other impulse groups.

19. A stored program digital computer comprising a memory unit for storing digital signals representing instruction and data words, an arithmetic unit for performing operations on said data word signals, and control means responsive to extracted instruction word signals to derive control signals for controlling computer sequences of operations including the selecting of subsequent instruction word signals from at least one of said units, the improvement comprising presettable means responsive to other signals derived by said control means in response to certain digital combinations occurring in said instruction word signals for controlling the arithmetic unit and initiating computer sequences of operations in accordance with the instant setting of said presettable means.

20. A computer according to claim 19 wherein said presettable means includes a plurality of switches each having a unique address associated therewith, preassigned combinations occurring within an instruction word signal relating to the addresses of said switches.

References Cited in the file of this patent

UNITED STATES PATENTS

| | | |
|---|---|---|
| 2,604,262 | Phelps et al. | July 22, 1952 |
| 2,815,168 | Zukin | Dec. 3, 1957 |
| 2,914,248 | Ross et al. | Nov. 24, 1959 |
| 2,916,210 | Selmer | Dec. 8, 1959 |

FOREIGN PATENTS

| | | |
|---|---|---|
| 764,522 | Great Britain | Dec. 28, 1956 |
| 783,086 | Great Britain | Sept. 18, 1957 |

OTHER REFERENCES

Rice: Why Not Try a Plugboard?, Proceedings of the Eastern Joint Computer Conference, Philadelphia, Pa. (Dec. 8–10, 1954), (pp. 4–10).